United States Patent [19]
Kashida et al.

[11] Patent Number: 5,642,240
[45] Date of Patent: Jun. 24, 1997

[54] VIDEO DATA RECORDING AND/OR REPRODUCING APPARATUS WITH CONTROL OF READ/WRITE OPERATION OF A MEMORY BASED ON BOUNDARY POSITIONS OF THE PICTURES IN THE VIDEO SIGNALS

[75] Inventors: Motokazu Kashida, Tokyo; Mitsuru Owada, Kanagawa-ken; Masahiro Ando, Kanagawa-ken; Akio Fujii, Kanagawa-ken; Makoto Gohda, Kanagawa-ken, all of Japan

[73] Assignee: Canon Kabushiki Kaisha, Tokyo, Japan

[21] Appl. No.: 167,330

[22] Filed: Dec. 15, 1993

Related U.S. Application Data

[63] Continuation of Ser. No. 999,726, Dec. 30, 1992, abandoned, which is a continuation of Ser. No. 384,256, Jul. 21, 1989, abandoned.

[30] Foreign Application Priority Data

| Jul. 25, 1988 | [JP] | Japan | 63-186301 |
|---|---|---|---|
| Jul. 25, 1988 | [JP] | Japan | 63-186302 |
| Jul. 25, 1988 | [JP] | Japan | 63-186303 |
| Jul. 25, 1988 | [JP] | Japan | 63-186304 |
| Jul. 25, 1988 | [JP] | Japan | 63-186305 |

[51] Int. Cl.[6] ................................................. G11B 5/02
[52] U.S. Cl. ........................... 360/22; 360/18; 386/91; 386/112
[58] Field of Search .............................. 360/27, 9.1, 14.1, 360/35.1, 36.2, 22, 19.1, 23, 18; 358/341, 343; 386/91, 112

[56] References Cited

U.S. PATENT DOCUMENTS

| 4,816,929 | 3/1989 | Bradley et al. | 360/35.1 |
|---|---|---|---|
| 4,916,553 | 4/1990 | Yoshioka et al. | 360/9.1 |
| 4,969,055 | 11/1990 | Oberjatzas et al. | 360/32 |
| 5,101,274 | 3/1992 | Yoshimura et al. | 358/143 |

*Primary Examiner*—Andrew L. Sniezek
*Attorney, Agent, or Firm*—Robin, Blecker, Daley & Driscoll

[57] ABSTRACT

An apparatus for recording video data by forming many tracks on a recording medium and/or for reproducing the video data from the tracks is provided with a memory which is arranged to have recording video data or reproduced video data supplied thereto. The apparatus detects the picture change-over portion of the video data obtained within the tracks and controls, in accordance with the detected position, an offset degree between the writing and reading addresses of the memory.

27 Claims, 15 Drawing Sheets

VIDEO DATA RECORDING AND/OR REPRODUCING APPARATUS WITH CONTROL OF READ/WRITE OPERATION OF A MEMORY BASED ON BOUNDARY POSITIONS OF THE PICTURES IN THE VIDEO SIGNALS

This is a continuation application under 37 CFR 1.62 of prior application Ser. No. 07/999,726, filed Dec. 30, 1992, now aband which is a cont. of Ser. No. 07/384,256 filed Jul. 21, 1989 (now aband.).

BACKGROUND OF THE INVENTION

1. Field of the Invention

This invention relates to a video data recording and/or reproducing apparatus and more particularly to an arrangement highly suited for a video data recording and/or reproducing apparatus wherein the picture change-over portion of the video data in one recording track differs from the position obtained in another track.

2. Description of the Related Art

FIG. 1 of the accompanying drawings shows in outline the typical arrangement of the conventional digital video tape recorder (hereinafter referred to as DVTR). The recording operation of the DVTR is as follows:

Referring to FIG. 1, an input image signal is converted into digital data by an analog-to-digital (hereinafter referred to as A/D) converter 30. Redundant data is removed by an encoder 31 by utilizing correlation between images. Next, an error correction code (ECC) is added by an ECC encoding circuit 32 to the digital data against occurrence of any error relative to the recording medium. Further, a modulator 34 performs a digital code modulating action to obtain a signal spectrum distribution suited for magnetic recording and reproduction. Then, the output of the modulator 33 is recorded on a magnetic tape 36 through a magnetic head 35.

In reproducing, the video data recorded on the magnetic tape 36 is reproduced through a reproducing head 37, a head amplifier 38 and a digital demodulator 39. The signal in this stage includes some code error relative to the recording medium (tape), as mentioned above, such an error resulting from dust, a flaw or the like. Therefore, the error is corrected by an ECC decoding circuit 40. After that, redundant information such as a synchronizing (hereinafter referred to as sync) signal is added and the input information is nearly completely restored to its original state by a decoder 41. Lastly, a digital-to-analog (hereinafter referred to as D/A) converter 42 converts the digital signal into an analog image signal which is similar to the input image information.

Many DVTRs of the kind described have recently been developed. FIG. 2 shows a recording track pattern formed by these DVTRs. As shown, one picture plane is formed with a plurality of tracks in general. For example, the video signal of a first field is recorded in the tracks T1 to T3 and the video signal of a second field in the tracks T4 to T6.

Generally, the number of tracks to be formed by the video signal of one field is arranged to be an even number, because this arrangement is advantageous in respect to the synchronized operation of the DVTR, concatenated recording, editing, variable speed recording, etc.

During recent years, the technology for encoding video data with a high degree of efficiency has made a rapid advancement mainly in the communication field for TV conference systems, TV telephone system, etc.

Meanwhile, a demand for a longer recording time of DVTRs has increased. The length of recordable time of the DVTR can be increased by using the high efficiency image encoding technique developed in the field of communication technology. The technique will likely come to be actively applied to the DVTR for this purpose.

However, an attempt to record data which is further compressed through a high efficiency encoding process with the highest possible degree of density would encounter a problem that the picture change-over position of the video data within a recording track on the recording medium tends to fluctuate and vary from that of another track. In such a case, it is difficult to have the video data received and produced in units of fields or frames. This would make it difficult to carry out the above-stated synchronized operation of the DVTR, concatenated recording, editing work, etc.

In a case that some video data is newly recorded by such a DVTR on a recorded tape, it is inevitable to have a picture having a drop-out part in its data. This does not mean simple drop-out of some picture elements within a picture but might make impossible the reproduction of all the picture elements of the picture, because the DVTR is generally arranged to utilize the correlation among picture elements of one and the same picture plane for the purpose of compressing the data. Further, even if only a reproducible picture can be extracted, it is impossible to adequately match the reproduction timing of one picture with that of another at the concatenating part between them. Therefore, adequate reproduction is hardly expectable under such a condition.

Further, if the data of such an imperfect picture remain on the tape, it would be impossible to reproduce any adequate picture from the tape. In other words, the video data becomes discontinuous as no image can be obtained from the data of the imperfect picture. This discontinuity of video data would result in a conspicuous skew or a skipped picture appearing at a concatenated part of the record. In this instance, even if some time code is recorded longitudinally on the tape, it becomes impossible to correlate the time code with the video data recorded in oblique tracks. As a result, it is impossible to locate a picture being looked up by finding its record ranging from a point in one track to a point in another. A quick look-up is difficult under such a condition.

This problem may be solved by recording one field or frame portion of the video data in an even number of tracks without fail. This method, however, hinders efforts to increase the recording density, because assuming that one field amount of video data is successfully compressed to be recordable in 2.1 tracks by the record density increasing efforts, this method still requires three tracks for one field amount of the video data.

SUMMARY OF THE INVENTION

This invention is directed to the solution of the problems described in the foregoing.

It is an object of the invention to provide video data recording and/or reproducing apparatus which is capable of supplying or producing recording or reproduced video data with desired timing even in cases where the picture change-over portion in a recording track of the video data varies with changes of tracks.

Under this object, an apparatus embodying one aspect of this invention and arranged to record video data forming many tracks on a recording medium and/or to reproduce the recorded video data from the tracks comprises: head means for recording video data by forming many tracks on the recording medium and/or for reproducing the video data from the tracks; a memory which is arranged to receive the video data to be supplied to the head means and/or to receive the video data reproduced by the head means; detecting means arranged to detect the picture change-over portion of the video data in the track formed on the recording medium and to generate detection data; and memory control means for controlling an offsetting degree between the writing address and the reading address of the memory in accordance with the detection data.

It is another object of the invention to provide a video data recording and reproducing apparatus which permits an editing operation to be adequately accomplished even in cases where the picture change-over portion of video data within a track varies with changes of tracks.

Under that object, an apparatus which embodies one aspect of this invention and is arranged to record video data by forming many tracks on a recording medium and to reproduce the recorded video data from the tracks comprises: head means for recording video data by forming many tracks on the recording medium and for reproducing the video data from the tracks; input means for receiving input video data; a memory which is arranged to permit writing therein the video data reproduced by the head means and the input video data supplied via the input means and to be capable of storing one track amount of video data; detecting means arranged to detect the picture change-over portion of the video data in the tracks formed on the recording medium and to generate detection data; and memory control means for controlling writing of the input data into the memory in such a manner that a part of one track amount of reproduced video data written in the memory is replaced with the input data according to the detection data.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
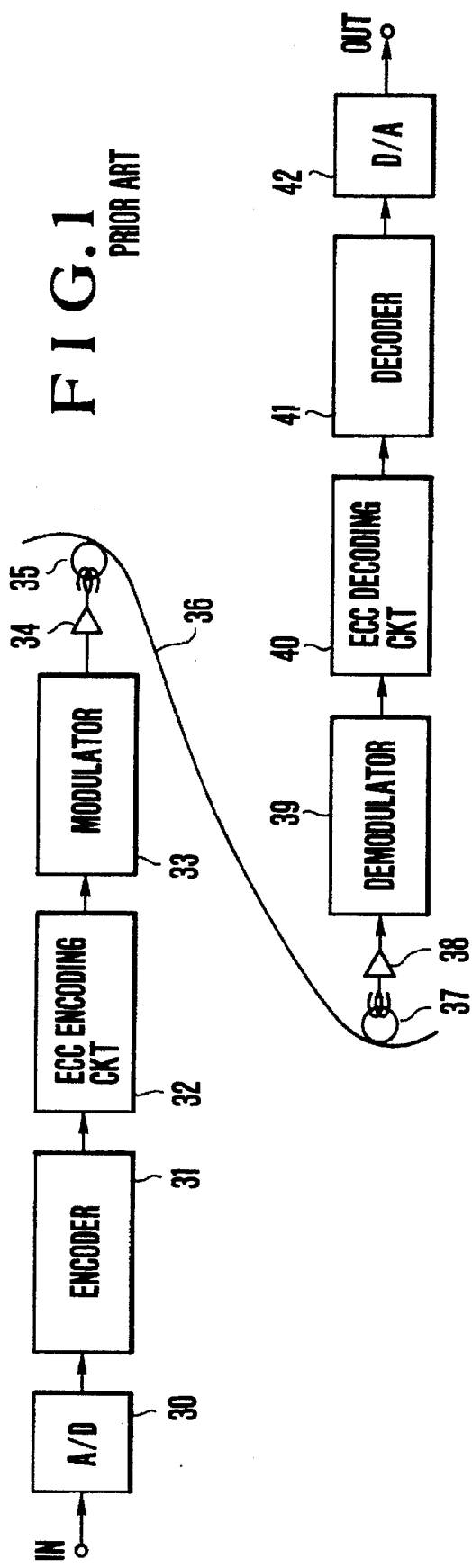
FIG. 1 shows the general arrangement of the conventional digital VTR.
Figure 2:
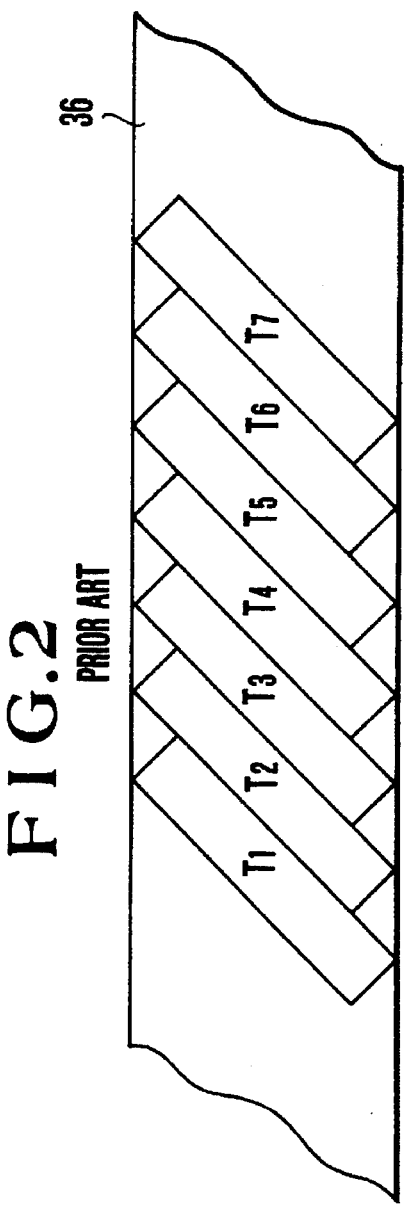
FIG. 2 shows a recording pattern formed on a tape by the digital VTR of FIG. 1.
Figure 3:
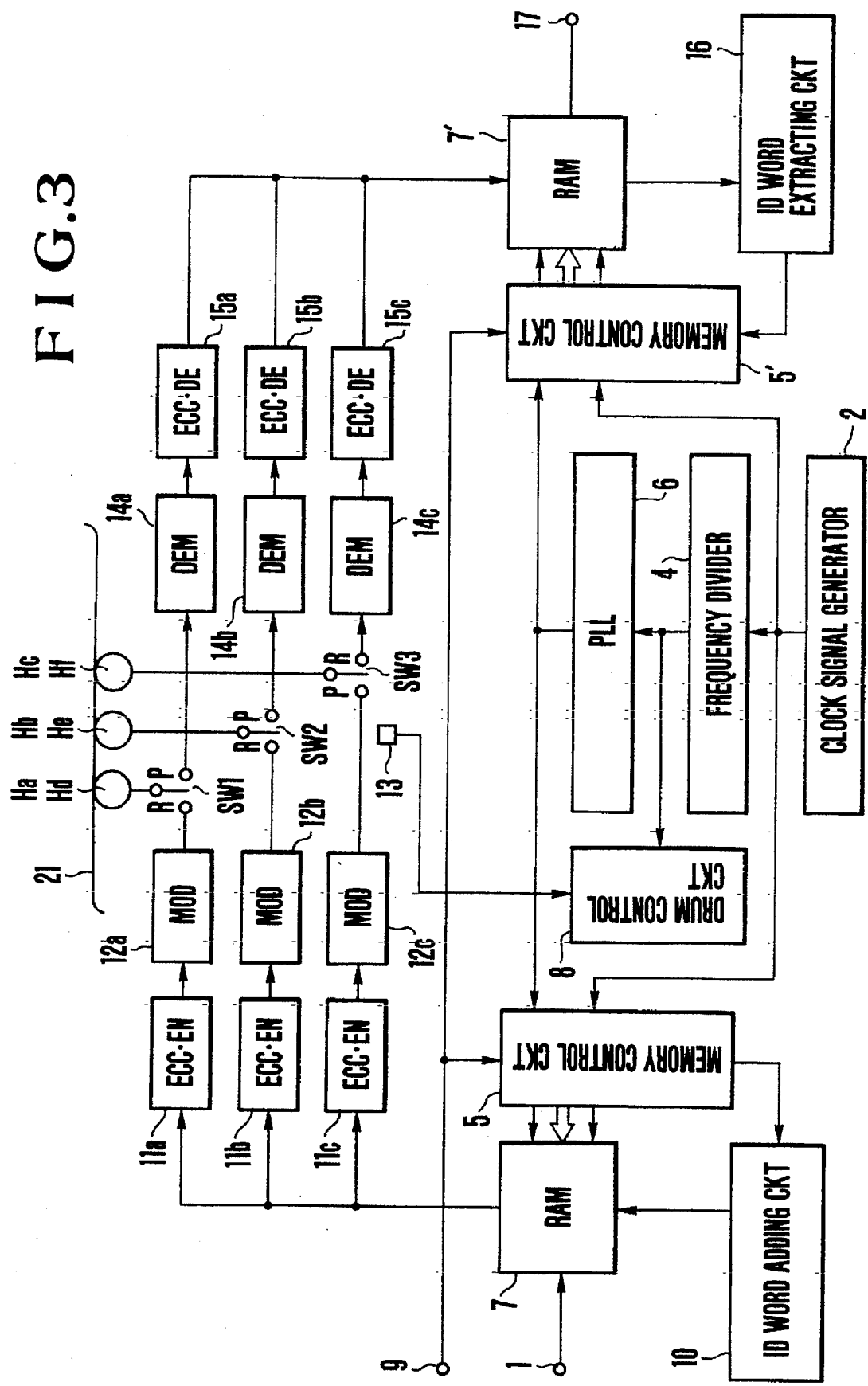
FIG. 3 shows in outline the arrangement of a digital data recorder arranged as a first embodiment of this invention.
Figure 4:
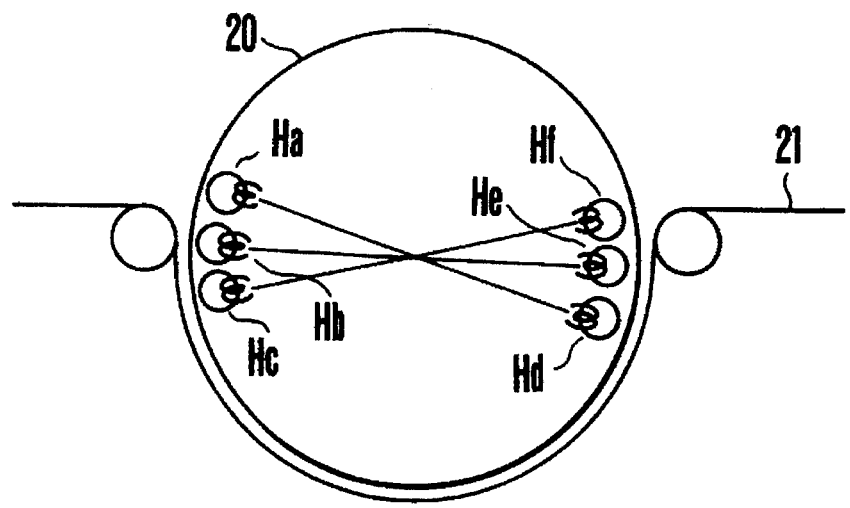
FIG. 4 shows the head arrangement of the digital data recorder of FIG. 3.
Figure 5:
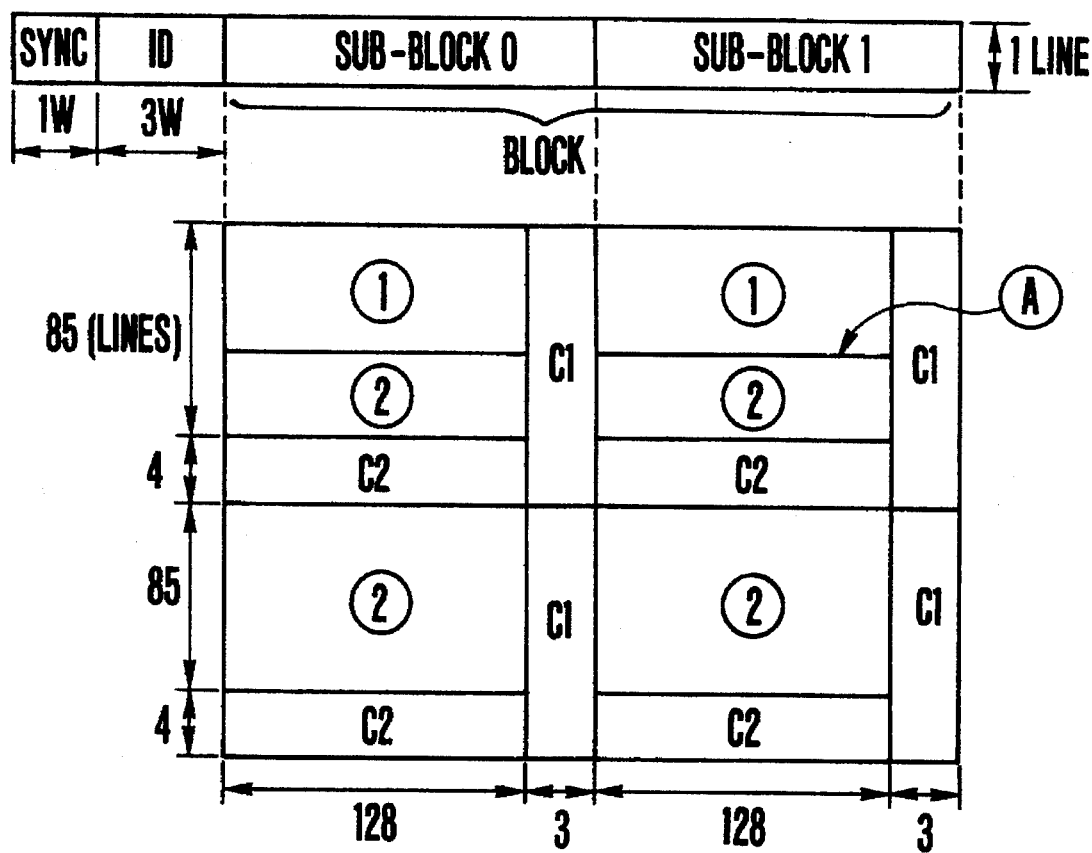
FIG. 5 shows a data format for one track of the digital data recorder of FIG. 3.
Figure 6:
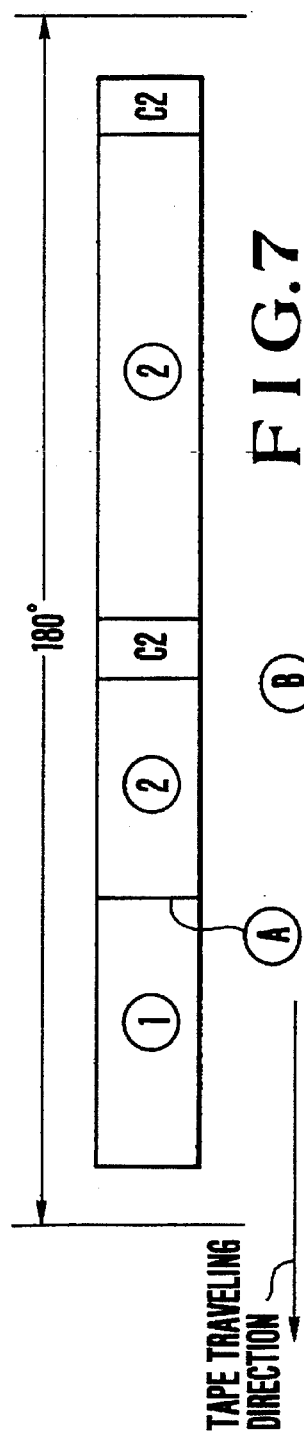
FIG. 6 shows a recording data format corresponding to one line of the format shown in FIG. 5.
Figure 7:
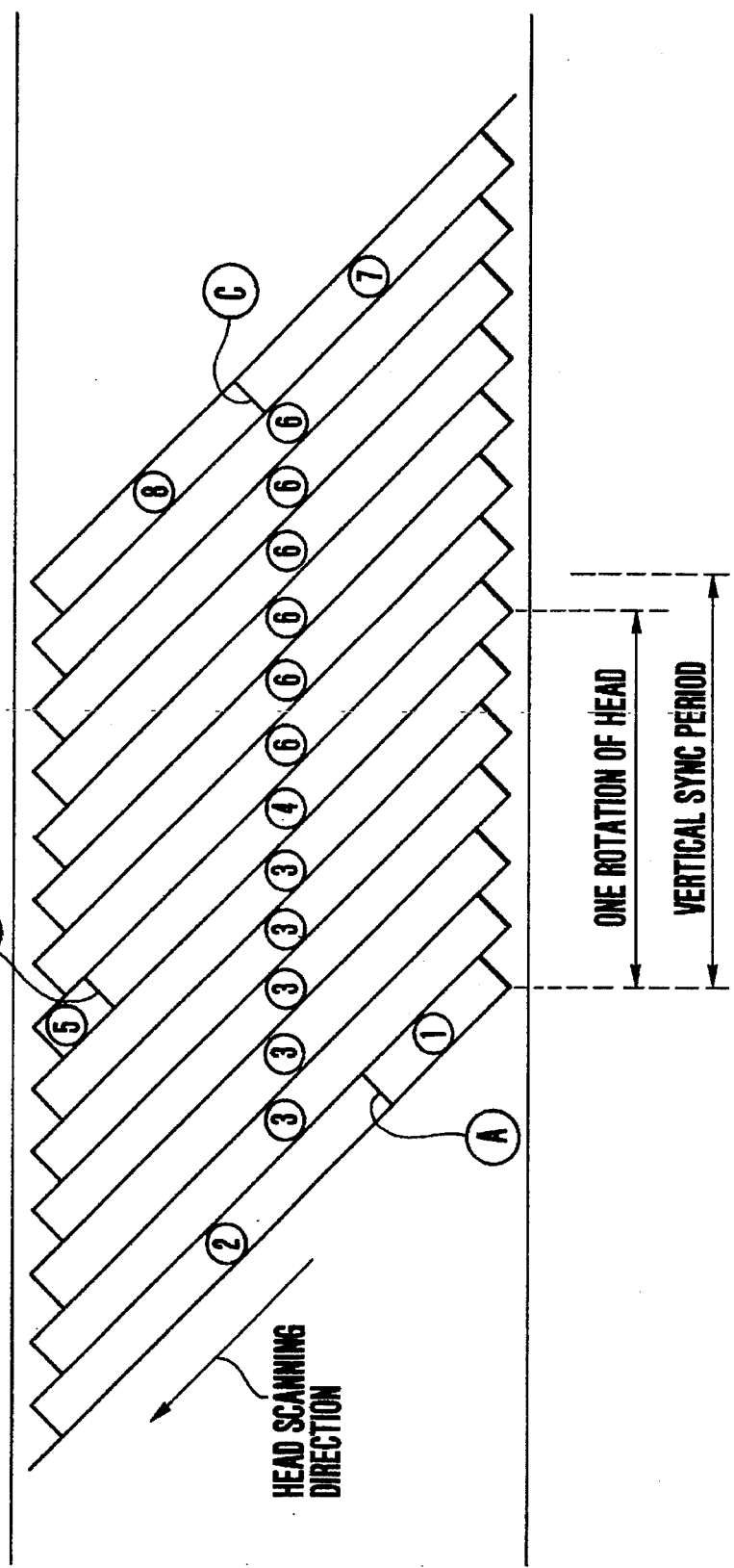
FIG. 7 shows a recording pattern formed on a tape by the digital data recorder of FIG. 3.
Figure 8:
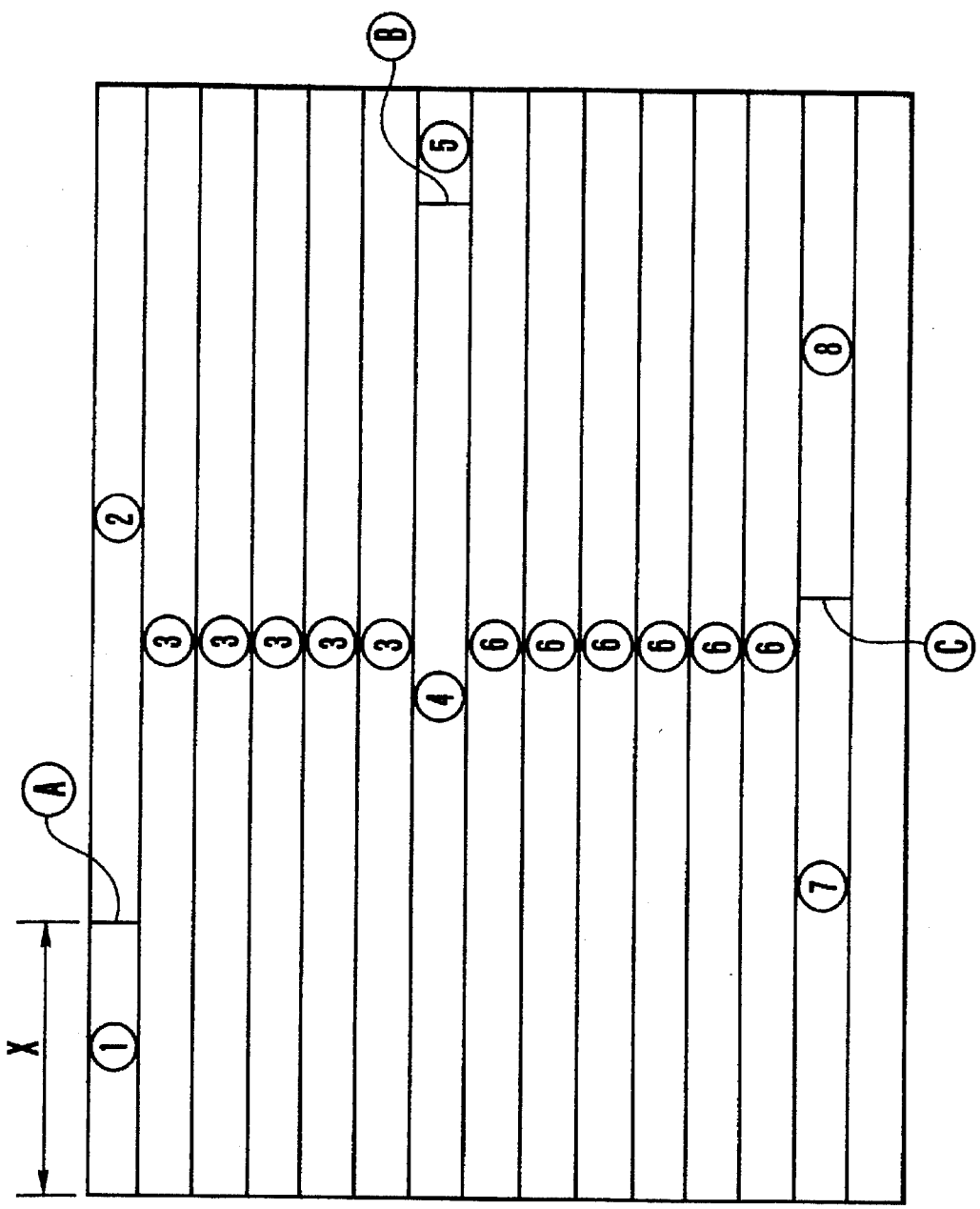
FIG. 8 shows the address allocation of the memory of the digital data recorder of FIG. 3.

This invention is described in further detail through embodiments thereof as follows:

FIG. 3 shows in outline the arrangement of a digital data recorder arranged as a first embodiment of the invention. FIG. 4 shows the allocation of a cylinder (or drum) and heads of the data recorder which is a first embodiment of the invention. FIGS. 5, 6 and 7 show the recording format of the first embodiment. FIG. 8 shows the memory space of the first embodiment.

Referring to FIG. 3, an input terminal 1 is arranged to receive a digital video signal to be recorded. A clock signal generator 2 is arranged to generate a clock signal. The clock signal is arranged to be frequency divided by a frequency divider 4 according to a frequency dividing ratio which has been set according to the amount of data per unit time of the input data. A memory control circuit 5 is arranged to supply a writing address and a writing enabling signal to a RAM 7 according to the clock signal produced from the clock signal generator 2. Data indicative of the input digital signal is written into the RAM 7 in this manner. A drum control circuit 8 is arranged to control the rotation of the drum in such a way as to have a rectangular wave signal of 200/3 Hz produced from a drum rotation detector 13 and the signal of 200/3 Hz from the frequency divider 4 synchronized with each other.

As shown in FIG. 4, the digital data recorder (hereinafter referred to as DDR) which is the first embodiment of the invention is provided with one set of three closely adjacent heads Ha, Hb and Hc and another set of three closely adjacent heads Hd, He and Hf. The two sets of heads are arranged on a rotary drum 20 to revolve at a phase difference of 180 degrees. A magnetic tape 21 is wrapped at least 180 degrees round the drum 20. Recording on the magnetic tape is performed by these six heads. The revolving positions of these heads Ha, Hb and Hc differ to a given distance from each other in the axial direction of revolution. The differing distance is set according to a recording track pitch. The other set of heads Hd, He and Hf are likewise arranged.

Assuming that the heads are revolving at 4000 rpm and the input data is a video data of a vertical sync frequency 60 Hz, each head makes 10/9 turn per vertical sync period. With the heads arranged as shown in FIG. 4, the data is recorded or reproduced in or from six tracks on the tape per turn of the heads (or drum) as indicated by a track pattern shown in FIG. 7.

FIG. 5 shows a format of the DDR of the first embodiment for recording one track amount of data. Referring to FIG. 5, the lines of data are formed from the left side to the right side one after another. The columns of data are formed from the highest line to the lowest. The format thus gives one track amount of serial data. FIG. 6 shows this in a simplified manner. In FIG. 6, the direction in which the data columns of one track are aligned from the left to the right coincides with the oblique direction of each track from the right-hand side bottom to the left-hand side top as shown in FIG. 7.

Assuming that a line (A) shown in FIG. 5 represents a vertical sync signal position within the input video data, recording data areas (1) and (2) shown in FIG. 5 correspond to the same areas (1) and (2) shown in FIGS. 6 and 7. Since the vertical sync signal position appears at every 10/9 turn of the head in the case of this embodiment, the vertical sync signal position in the direction of tape width is inconstant, as shown by positions (B) and (C), and the track in which it exists is hardly detectable.

Referring to FIG. 5, the data of each line is divided into two in the lateral direction. Parity bits C1 of an error correction code for correction of a data error are added as sub-blocks 0 and 1. Further, a sync pattern Sync for block synchronization and ID data for block identification are added immediately before the sub-blocks 0 and 1 by means of an ID word adding circuit 10 shown in FIG. 3. For a stronger effect of error correction, parity bits C2 of an error correction code are added to four lines at every 85 lines in the vertical direction. As shown in the format of FIG. 5, the ID data includes block numbers indicating the vertical position of the line having a block consisting of the two sub-blocks. The ID data further includes V data indicating whether the above-stated block is a first block from the vertical sync signal position in the input video data. The block number and the V data are formed by a memory control circuit 5 on the basis of a clock signal produced from the clock signal generator 2, a clock signal produced from a PLL circuit 6 and the vertical sync signal included in an input video signal supplied to a terminal 9.

Using the clock signal produced from the PLL circuit 6 as a reading clock signal, the memory control circuit 5 supplies a reading enabling signal and a reading address to the RAM 7. Reading from the RAM 7 is performed according to these signals. The data thus read out from the RAM 7 is allotted in units of data blocks to three recording channels. The data is then supplied to the heads through error correction encoders (ECC-EN) 11a, 11b and 11c which are arranged to add the above-stated parity bits C1 and C2 and the sync pattern Sync to the recording data, digital modulators (MOD) 12a, 12b and 12c and the terminals R of switches SW1, SW2 and SW3. Each pair of heads Ha and Hd, Hb and He or Hc and Hf are arranged to serve as the recording heads of the same channel.

The reproducing system of the first embodiment is arranged as follows: Reproduced signals obtained by the heads of the three channels are supplied via the terminals P of the switches SW1, SW2 and SW3 to demodulators (DEM) 14a, 14b and 14c to be demodulated there. After that, the demodulated signals are supplied to error correcting decoders (ECC-DE) 15a, 15b and 15c to be error corrected by means of the parity bits C1 and C2. The outputs of the error correcting decoders are serially written into a RAM 7'.

FIG. 8 shows the data storing areas of the RAM 7'. In FIG. 8, one line amount of data laterally shown represents just one track amount of data. Data (1) to (8) and (A) to (C) are identical with the data (1) to (8) and (A) to (C) shown in FIG. 7.

If the data is arranged, for example, to be produced in synchronism with an external vertical sync signal during a reproducing operation, the vertical sync position (A) is detectable from the ID data indicating the block number in the reproduced signal and also from the V data included therein. More specifically, it is possible to know the line number of the block which includes the V data. In other words, it is possible to know the sidewise offset degree indicated by a symbol X in FIG. 8. Therefore, a reading action is serially performed on the RAM 7' by adding the offset degree X to the reading address of the RAM 7' as shown in FIG. 8.

In other words, an ID word extracting circuit 16 extracts the block number and the writing address of the memory RAM 7' is controlled on the basis of the extracted block number. Further, the offset degree X which is to be extracted at the same time is extracted by a memory control circuit 5'. An external vertical sync signal to be used for reading is supplied from the terminal 9. Reading from the address of the above-stated offset degree X is performed in synchronism with the external vertical sync signal. As a result, reproduced signal data which is synchronized with the external vertical sync signal is produced from a terminal 17.

The RAM 7 of the recording system and the RAM 7' of the reproducing system are described in the foregoing as arranged separately from each other for the sake of simplification of illustration. In actuality, however, one of them including the memory control circuit 5 or 5' may be arranged to be used in common both for recording and reproduction. With the embodiment arranged as described above, the video signal can be reproduced in synchronism with any external vertical sync signal. This facilitates a synchronized operation of two DVTRs and editing work.

The use of the embodiment for concatenated recording is briefly described as follows: When a pause switch is pushed, data is stored in the RAM 7' as shown in FIG. 8. One RAM 7 or 7' is assumed to be used in common for the recording and reproducing systems in this case. The tape is first rewound to a given extent and is then transported at an ordinary recording or reproducing speed.

Next, using such information as a time code or the like, data is not read out from the RAM 7 until arrival of the reading timing of the RAM 7 for the signal to be recorded at the start timing of the tracing action of the heads on the three tracks including the vertical sync position (A) as shown in FIG. 7. After this timing, the recording data is read out from the addresses of the RAM 7 according to block numbers. In this instance, the concatenated recording can be adequately accomplished by writing data from the address determined according to the above-stated offset degree X in synchronism with the vertical sync signal of the input image signal.

Video data recording thus can be correlated to a picture change-over point of a track by offsetting the writing address in the manner as described above.

As described in the foregoing, the embodiment is capable of handling video data in units of pictures by offsetting the reading or writing address according to the information on the picture change-over point of the track irrespectively of the position of the change-over point within the track. Therefore, the video signal can be recorded for the longest possible period of time without causing any disadvantage in carrying out various processes on the video signal.

Figure 9:
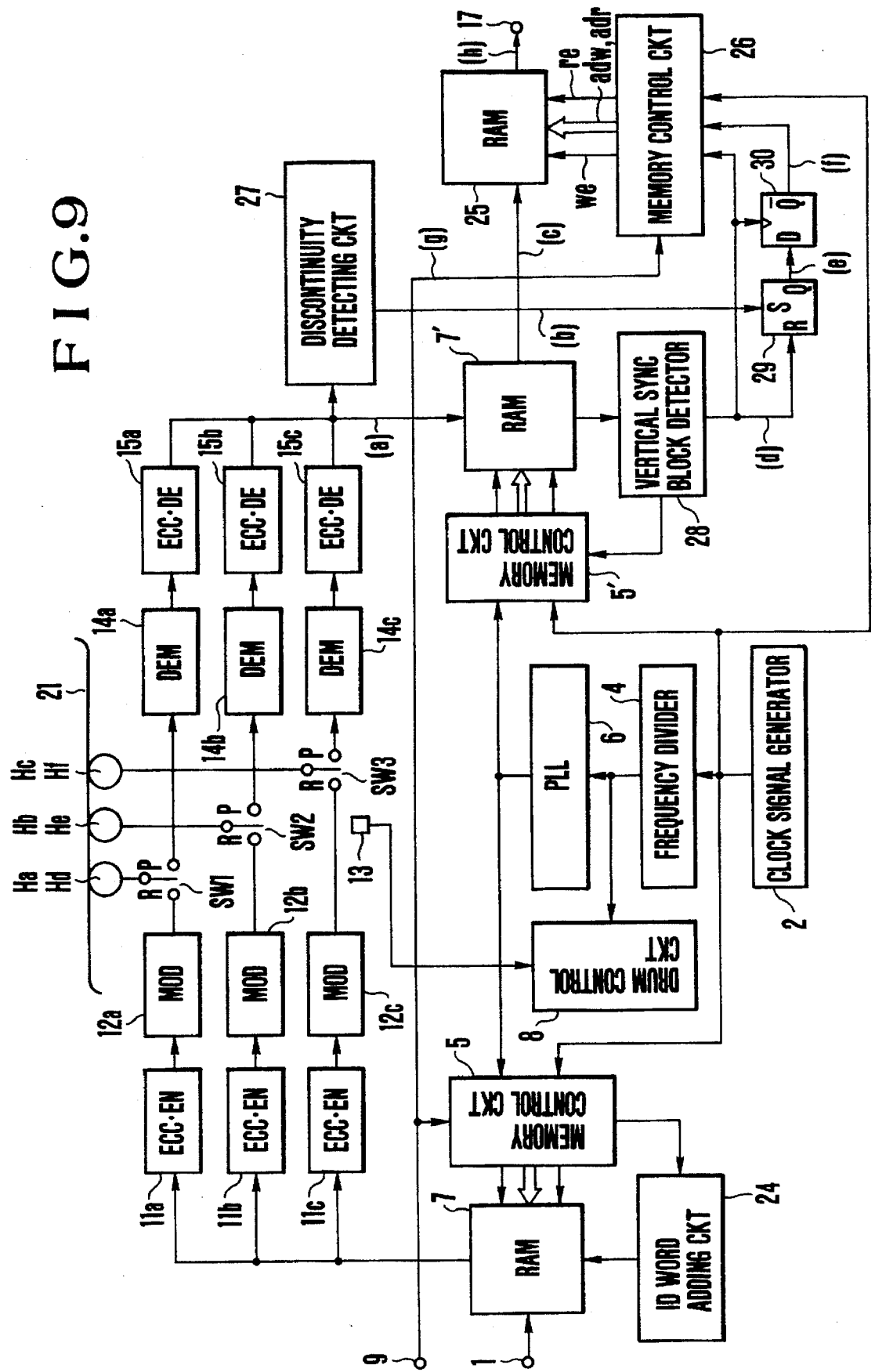
FIG. 9 shows in outline the arrangement of a digital data recorder arranged as a second embodiment of the invention.

FIG. 9 shows in outline the arrangement of a digital data recorder (DDR) which is arranged as a second embodiment of this invention. In FIG. 9, the same component parts as those of FIG. 3 are indicated by the same reference numerals and the details of them are omitted from the following description:

The DDR of FIG. 9 (the second embodiment) is arranged to perform its recording action in the same manner as the DDR of FIG. 3 (the first embodiment) and its recording format is also similar to that of the first embodiment. Therefore, the details of the DDR of FIG. 9 require no further description. In the case of the DDR of FIG. 9, however, the ID data to be added by the ID word adding circuit 24 includes block position data which shows the location of each video data block relative to the location of the vertical sync signal of the input video data.

The following describes the reproducing system of the second embodiment. In cases where a video signal is to be reproduced from a tape having some video data recorded thereon without carrying out the above-stated process of correlating its picture change-over position with the picture change-over position of an existing video data record, the reproducing system operates as follows: In this instance, the presence of the above-stated imperfect picture data might cause the video data stored in the RAM 7' to have some discontinuity in the picture change-over timing. Even in the event of existence of data of such an imperfect picture in the RAM 7', the second embodiment is capable of producing adequate video data from the output terminal 17.

Figure 10:
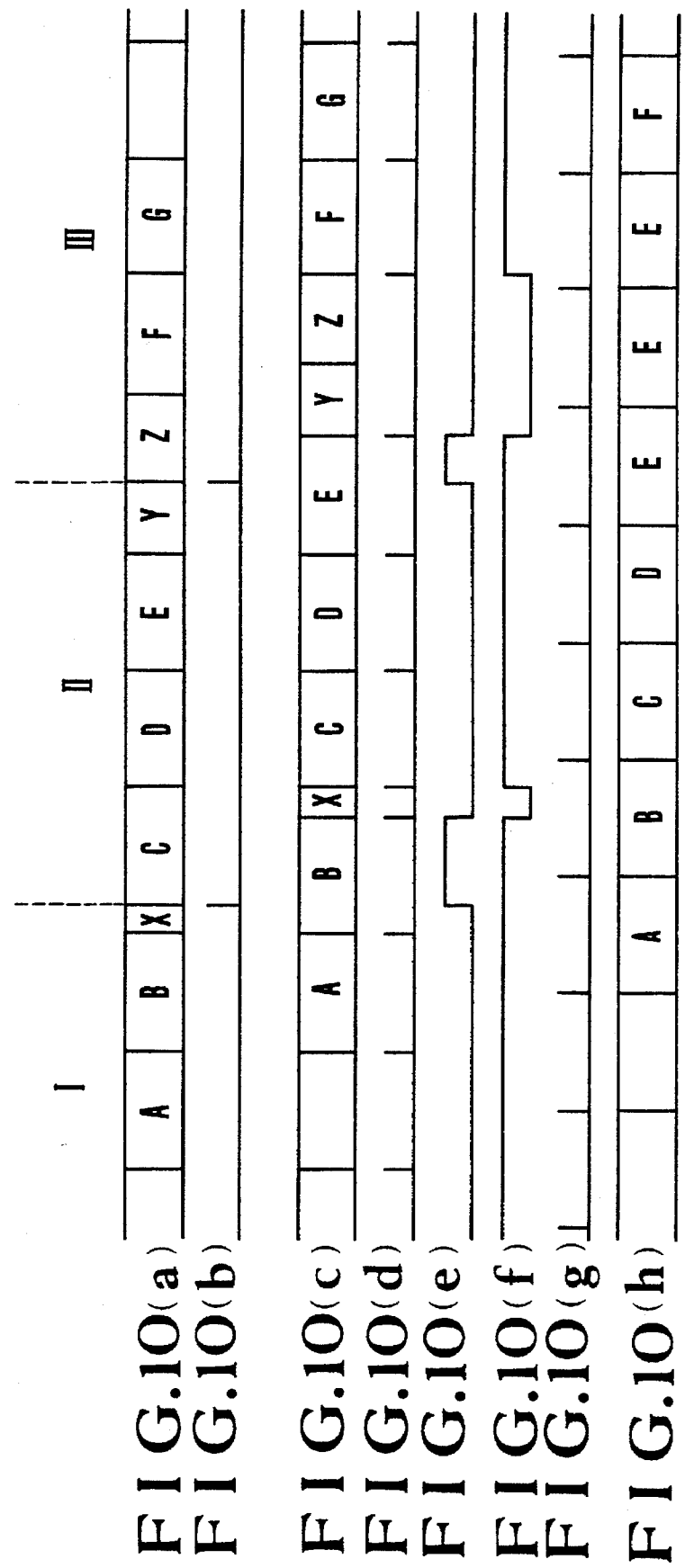
FIGS. 10(a) to 10(h) show in a timing chart the operation of the digital data recorder of FIG. 9.

FIGS. 10(a) to 10(h) show, in a chart, the timing of data indicated in the parts (a) to (h) of FIG. 9. Video data which is as shown in FIG. 10(a) is written into the RAM 7'. In FIG. 10(a), reference numerals I, II and III denote video data parts recorded by recording operations separately performed. The part II is last recorded. Each of reference symbols A, B, C, D, E, F and G denotes data for one complete picture. Each of symbols X, Y and Z denotes data of an incomplete picture in defect of some part thereof. In other words, the record of the part II begins in an intermediate track of the picture of the data X and ends halfway in the picture of the data Z. The latter halves of the data X and Y and the first half of the data Z are missing.

In FIG. 9, a reference numeral 27 denotes a discontinuity detecting circuit which is arranged to detect the discontinuity of the video data. When the video data is found to have a discontinuous part on the basis of the above-stated block position data, the detecting circuit 27 produces a pulse. Assuming that one field amount of the video data consists of an n number of data blocks, the above-stated block position data exists within a number of blocks from 0 to (n-1). Except a process of returning from the block (n-1) to the block 0, the discontinuity, or inconsecutiveness, of the block position data can be detected. FIG. 10(b) shows the pulse produced from the discontinuity detecting circuit 27.

Data is written into the RAM 7' by the memory control circuit 5' in accordance with a clock signal produced from the PLL circuit 6 and read out from the RAM 7' in accordance with a clock signal produced from the clock signal generator 2. At the memory control circuit 5', writing and reading addresses are set in such a manner that the video data is read out one field period after writing. Therefore, the video data read out from the RAM 7' becomes as shown in FIG. 10(c).

A vertical sync block detector 28 is arranged to detect that the block position data of the data block read out from the RAM 7' is at "0". In other words, the detector 28 detects that the block of a vertical sync part is read out from the RAM 7'. Upon detection of it, the vertical sync block detector 28 produces a pulse which is as shown in FIG. 10(d).

An S-R flip-flop (hereinafter referred to as S-R FF) 29 is arranged to be set by the above-stated discontinuity detection pulse (b) and to be reset by the vertical sync block detection pulse (d). The output of the S-R FF which is as shown in FIG. 10(e) is supplied to the terminal D of a D flip-flop (hereinafter referred to as D-FF) 30. To the clock terminal of the D-FF 30 is supplied the vertical sync block detection pulse. The $\overline{Q}$ output of the D-FF 30 is as shown in FIG. 10(f). A period of time during which this output of the D-FF 30 is at a low level corresponds to a period during which the video data for one complete picture is read out from the RAM 7'. A memory control circuit 26 is arranged to control writing and reading to and from a RAM 25 which is of a capacity for one field amount of video data. The output (f) of the D-FF 30 (FIG. 10(f)) is used as a writing enabling signal "we". A reading enabling signal "re" is produced always at a high level from the circuit 26. By this, the video data X, Y and Z of incomplete pictures are never written into the RAM 25 while the video data of complete pictures which are not in defect of any data are written into the RAM 25. The writing and reading addresses "adw" and "adr" of the RAM 25 are arranged to be incremented by one at a time in accordance with the clock signal produced from the clock signal generator 2. The writing address "adw" is arranged to be reset by the vertical sync block detection pulse (d) and the reading address "adr" by an external vertical sync signal which is as shown in FIG. 10(g) and is supplied through the terminal 9.

As a result, the data read out from the RAM 25 becomes as shown in FIG. 10(h). As shown, the video data of a picture having no defective data is alone read out for every one field period. As apparent from FIG. 10(h), the RAM 25 serves as a buffer memory. A shortage of data written in is offset by adjusting a delay time. In the event of any shortage of written-in data exceeding one field amount, one and the same picture is repeatedly read out to compensate for the shortage.

The DDR of the second embodiment is thus arranged to produce from the terminal 17 one picture amount of defectless data for every field period even in cases where data of incomplete pictures are left on the tape. Further, the second embodiment is illustrated as having the RAM 7 of the recording system and the RAM 7' of the reproducing system separately arranged. However, this is for the sake of simplification of illustration. It may generally be more practical to have one of them and also one of the memory control circuits 5 and 5' singly arranged for common use both by the recording and reproducing systems.

Further, the arrangement of the second embodiment may be changed to write all the data into the RAM 25 and to make interpolation thereafter for any incomplete picture part of the data read out from the RAM 25.

As described above, the video data reproducing system of the second embodiment is capable of reproducing an adequate image without any skew or picture skipping even in the event of a recording medium having data of some picture that is partly in defect of data.

Figure 11:
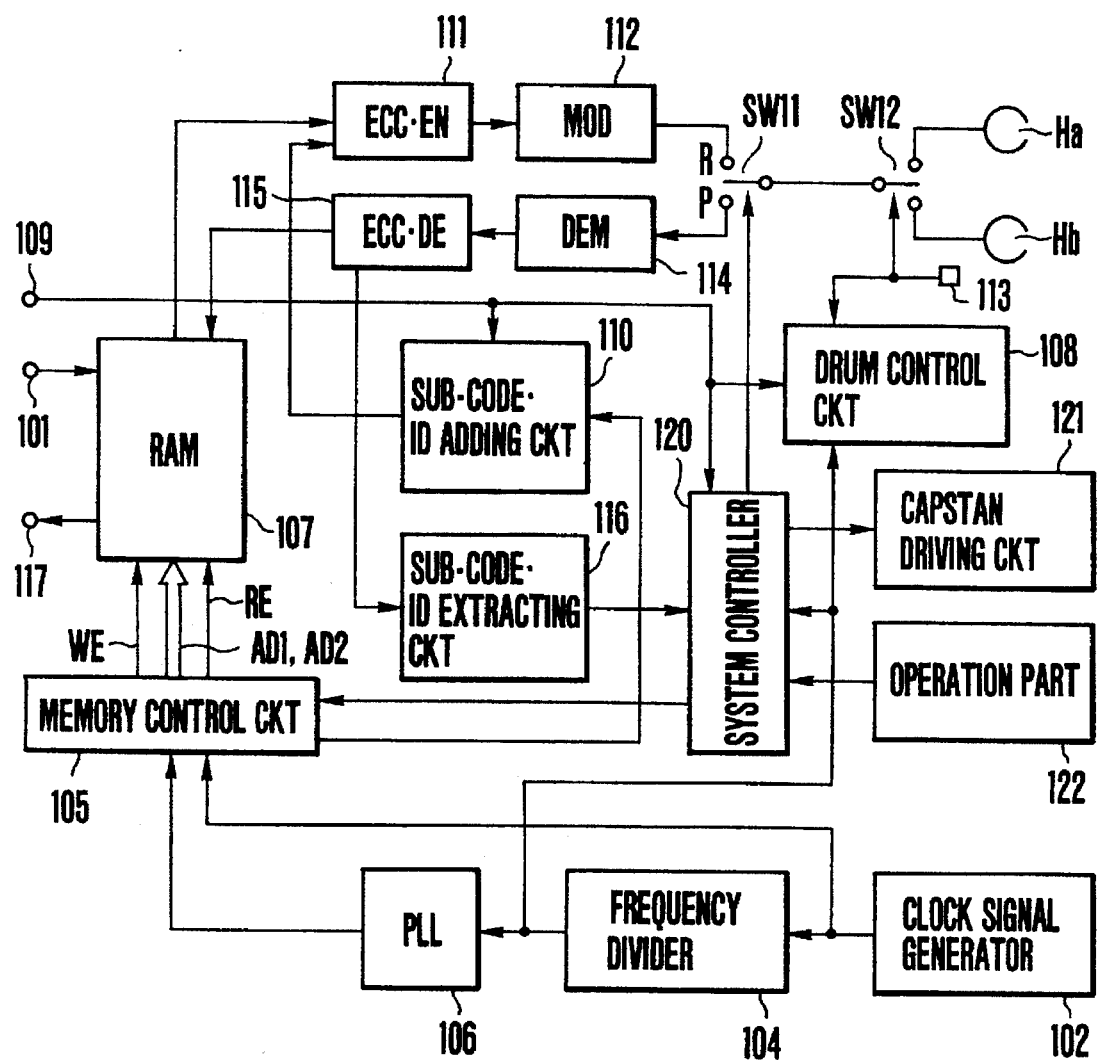
FIG. 11 shows in outline the arrangement of a digital data recorder arranged as a third embodiment of the invention.
Figure 12:
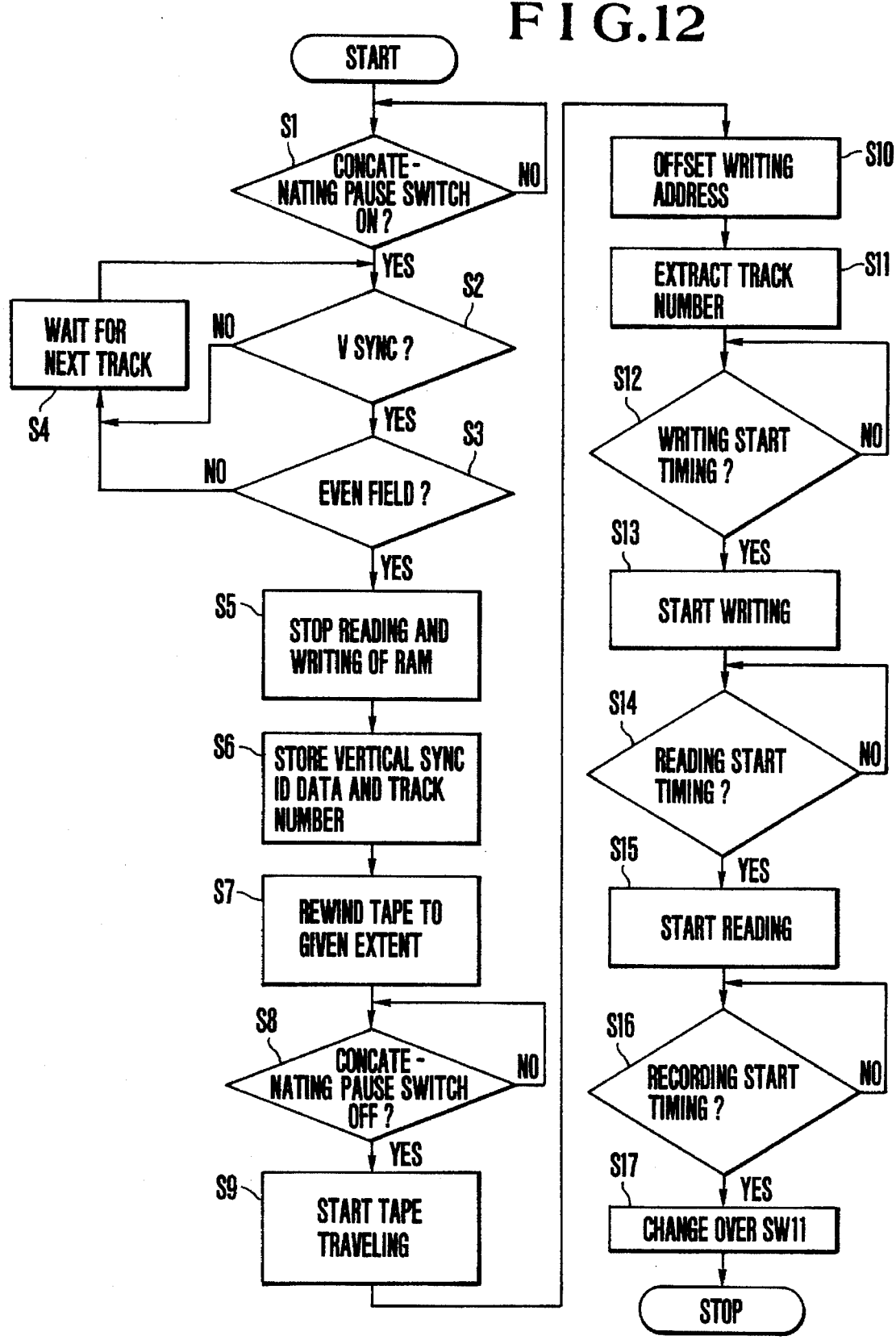
FIG. 12 is a flow chart showing the operation of the digital data recorder of FIG. 11.
Figure 13:
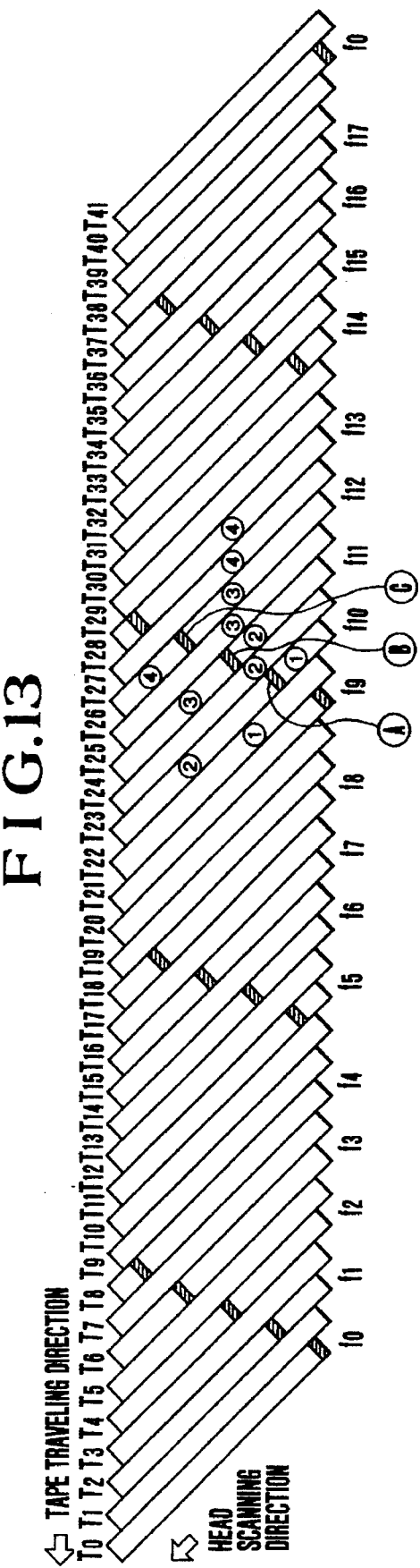
FIG. 13 shows a recording pattern formed on a tape by the digital data recorder of FIG. 11.
Figure 14:
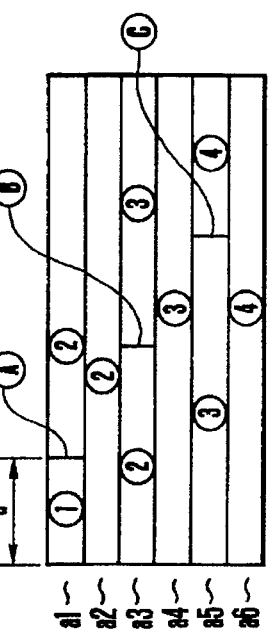
FIG. 14 shows the address allocation of a memory of the digital data recorder of FIG. 11.

FIG. 11 shows in outline the arrangement of a digital data recorder (DDR) which is arranged as a third embodiment of this invention. FIG. 12 shows in a flow chart the operation of the system controller of the DDR of FIG. 11 to be performed in carrying out concatenated recording. FIG. 13 shows the format of the same DDR for recording on a tape (recording medium). FIG. 14 shows the memory space of the same DDR.

The DDR (the third embodiment) of FIG. 11 is arranged to perform recording in the following manner: Referring to FIG. 11, an input terminal 101 is arranged to receive a recording digital video signal. A clock signal generator 102 is arranged to generate a clock signal. The clock signal generated by the generator 102 is frequency divided by a frequency divider 104 according to a given frequency dividing ratio which has been set according to the data amount of input data. A memory control circuit 105 is arranged to supply a writing address AD1 and a writing enabling signal WE to a RAM 107 in accordance with the clock signal produced from the clock signal generator 102. Data indicative of the input digital signal is thus written into the RAM 107.

The third embodiment is provided with two heads. The heads are arranged to revolve at a phase difference of 180 degrees from each other. The rotational frequency of these heads is 4000 rpm. With the input data assumed to be a video data of a vertical sync frequency 60 Hz, each head makes 10/9 turn per vertical sync period. A number of tracks required in recording one field amount of data is 20/9. Therefore, as indicated by a hatched parts in FIG. 13, the vertical sync position varies to a degree of 2/9 track per field. Accordingly, a total of nine different vertical sync positions are obtainable in the tracks. Since there are even-number fields and odd-number fields, frame synchronization can be detected for 18 different fields from f0 to f17. Further, some of the tracks do not have the vertical sync signal. Therefore, including it, a total of 19 different identifying actions are necessary. In recording, a drum control circuit 108 of FIG. 11 controls the drum of the heads in such a way as to have a predetermined phase relation between a signal of 20/3 Hz which is obtained by frequency dividing into five a rectangular wave signal of 100/3 Hz produced by five and a signal of 20/3 Hz which is obtained by frequency dividing into nine the vertical sync signal (60 Hz) of the input video signal supplied via an input terminal 109. This control enables the above-stated 19 different identifying actions to determine the position of the vertical sync signal. The vertical sync signal position identifying data of the above-stated 19 different identifying actions can be expressed in five bits. For example, the "0" and "1" of the least significant bit are allotted to the even-number field and the odd-number field. The remaining four bits are allotted to information about the presence or absence of the vertical sync signal and the pattern position of the vertical sync signal if the signal is present.

Figure 15:
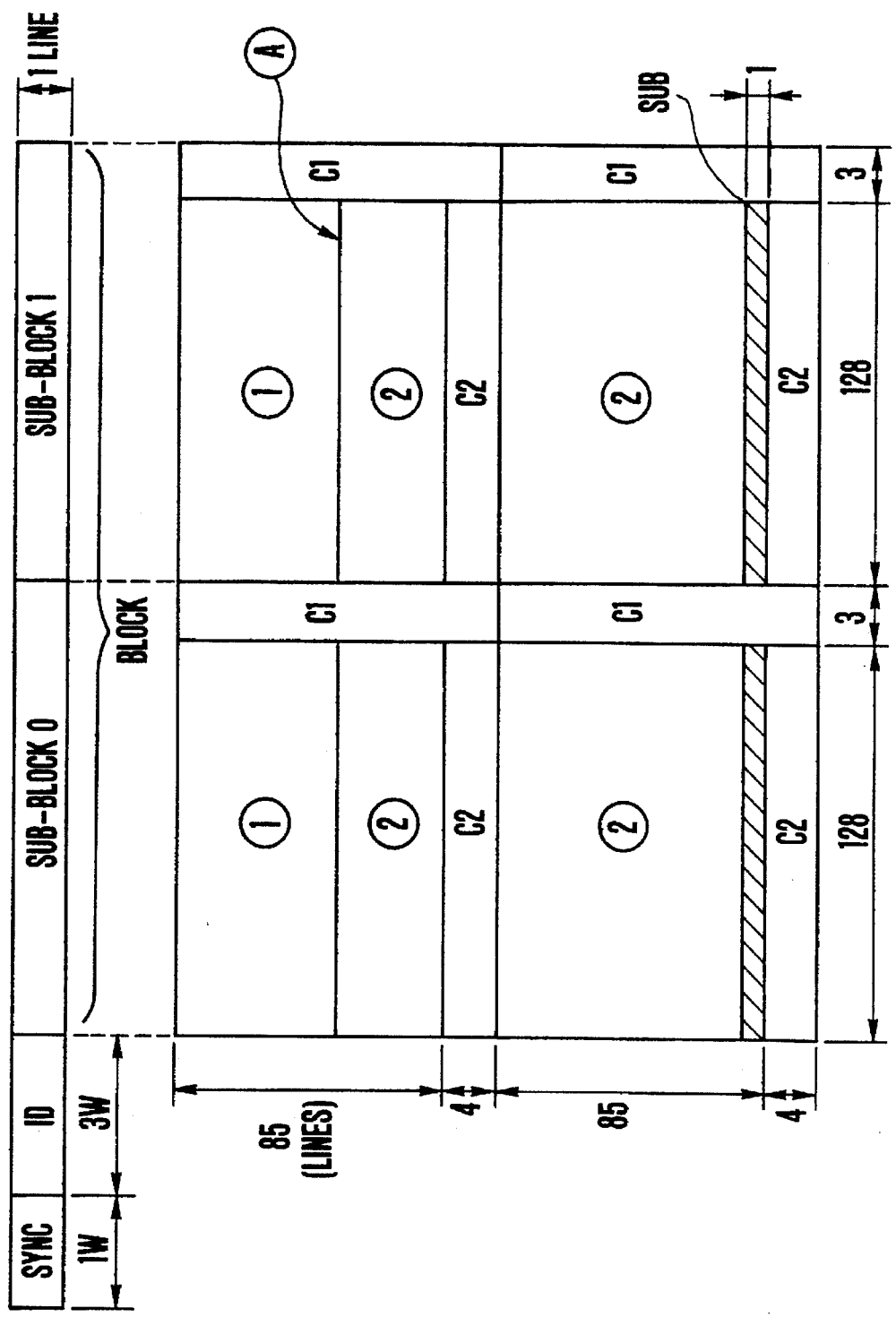
FIG. 15 shows the data format for one track of the digital data recorder of FIG. 11.

FIG. 15 shows one track amount of the recording data of the DDR of the third embodiment. As shown, a difference of the one-track amount of recording data of the third embodiment from that of the first embodiment shown in FIG. 5 lies in the presence of sub-code data SUB. More specifically, a reference symbol SUB in FIG. 15 denotes sub-code data. The sub-code data SUB includes the above-stated vertical sync (signal) identifying data and track number data indicative of the serial number of the track. The sub-code data SUB is formed by a sub-code·ID adding circuit 110 along with the ID data which is mentioned in the foregoing.

The memory control circuit 105 is arranged to supply a RAM 107 with a reading address signal AD2 and a reading enabling signal RE in accordance with the output of a PLL circuit 106 by using it as a reading clock signal. Data read out from the RAM 107 is supplied to an error correction encoder (ECC-EN) 111 which is arranged to add the above-stated parity bits C1 and C2, a sync pattern Sync, the ID data and the sub-code. The data is also supplied to heads Ha and Hb through a digital modulator (MOD) 112 and the terminal R of a switch SW11. The use of the heads Ha and Hb is switched from one over to the other by a switch SW12 at every 3/200 sec according to the output of a drum rotation detector 113.

The reproducing operation is arranged to be performed as follows: A signal reproduced by each of the heads is supplied via the terminal P of the switch SW11 to a digital demodulator (DEM) 114 to be demodulated. The demodulated signal is supplied to an error correction decoder (ECC-DE) 115 to have its error corrected with parity bits C1 and C2. After that, the reproduced signal is serially written into the RAM 107.

The memory control circuit 105 sets a reading address AD2 according to the clock signal produced from the clock signal generator 102 and sets a writing address AD1 according to the clock signal produced from the PLL circuit 106. Reproduced video data is thus written in and read out from the RAM 107. The reproduced video data read out from the RAM 107 is eventually produced from an output terminal 117. During reproduction, the drum control circuit 108 is controlled in such a way as to phase synchronize the rectangular wave signal of 100/3 Hz which is produced from the drum rotation detector 113 with the signal of 100/3 Hz which is produced from the frequency divider 104.

The DDR of the third embodiment performs a concatenating recording operation as described below with reference to the flow chart of FIG. 12, wherein reference symbols S1 to S17 represent step numbers:

Step S1: During a reproducing operation, if a system controller 120 finds that a concatenating pause switch has been turned on by an operation part 122, the flow of operation comes to a step S2. Step S2: A check is made to find if a vertical sync signal is included in the currently reproduced track through the above-stated vertical sync signal identifying data which is detected by the sub-code·ID extracting circuit 116. If so, a check is made at a step S3 to see if the vertical sync signal follows an even-number field also through the vertical sync signal identifying data. In case that no vertical sync signal is found to be present at the step S2 or that the vertical sync signal detected follows an odd-number field, the reproducing operation is allowed to continue and the flow comes to a step S4. Step S4: The flow waits until the video data is reproduced from a next track.

The reproducing operation is thus allowed to continue until a track having a vertical sync signal following an even-number field is reached. After that the flow comes to a step S5. Step S5: Reproduced data is stopped from being written into the RAM 107 and from being read out and supplied to the terminal 117.

FIG. 14 shows the data storing areas of the RAM 107. Each of the areas a1 to a6 is capable of storing one track amount of data. During the process of reproduction, the reproduced data is serially stored in each of the areas starting from one end part of the track. The capacity of the RAM 107 is arranged to be for a number of tracks which permits one frame amount of video data to be recordable continuously from and to adjoining frames. In other words, the RAM 107 has a capacity for six tracks in the case of the third embodiment. Assuming that the vertical sync signal which follows an even-number field and is detected at the step S2 or S3 is a signal (A) of the track T22 as shown in FIG. 13 and that the reproduced data is written from this track T22 into an area a1 of the RAM 107, both the data of a field (1) and the data of another field (2) are written into the area a1. Meanwhile, data reproduced from tracks T17 to T21 are stored in other areas a2 to a5.

Step S6: Under the above-stated condition, the vertical sync signal identifying data and the track number of the track T22 are stored in the system controller 120. Step S7: After the step S6, the system controller 120 controls a capstan driving circuit 121 to cause the tape to be rewound to a given extent. The controller then waits for the start of concatenated recording. Step S8: A check is made to find if the above-stated concatenating pause switch is turned off. If so, the flow comes to a step S9 to again allow the tape to travel.

Then, since the position of vertical sync signal has been found from the above-stated vertical sync signal identifying data previously stored, the system controller 120 knows that the vertical sync signal part is at the address offset to an extent "a" as shown in FIG. 14. Step S10: The system controller 120, therefore, causes the memory control circuit 105 to set the first writing address at this offset address. Step S11: The tape is allowed to travel while the track number which is included in reproduced data is extracted from each track of the tape by the sub-code•ID extracting circuit 116.

Step S12: In accordance with the track number thus extracted and a signal of 100/3 Hz produced from the frequency divider 104, the system controller 120 waits for arrival of a point of time preceding by one frame period the time for reading out from the RAM 107 the data to be recorded in the track T22. After this time point, when a vertical sync signal following an even-number field is supplied for the first time via the terminal 109, the system controller 120 determines the timing of receipt of this vertical sync signal to be a writing start timing. Step S13: Then, the memory control circuit 105 is caused to write a new video signal into the RAM 107 beginning from the above-stated offset address.

Reading start timing arrives within one frame period after the above-stated start of writing. The reading start timing is determined according to the timing of start of tracing the track T22 by the head. Step S14: A check is made for the arrival of the reading start timing. Step S15: Upon arrival of the reading start timing, data reading is caused to begin at the leading address of the area a1 of the RAM 107. Recording start timing arrives when the data read out from the RAM 107 reaches the switch SW11 to let the head to begin to trace the track T22. Step S16: A check is made for the arrival of the writing start timing. Step S17: Upon arrival of the timing, the connecting position of the switch SW11 is shifted from its one side P to the other side R. Then, actual recording begins. Adequate concatenated recording can be accomplished by this without any disturbance of the image at the concatenating part.

The DDR of the third embodiment described above is arranged to have the vertical sync signal recorded in nine different positions. However, even if the DDR is arranged to have the vertical sync signal recorded in random positions, the offset degree of the writing address can be likewise determined with the data which indicates the position of a vertical-sync-signal including block as counted from the end of the track recorded as a sub-code data. Further, in case that the serial number of each block counted from the end of each track is recorded as the ID data of the block, one bit which indicates whether or not the block is the first block after the vertical sync signal may be added to the ID data of each block. This arrangement likewise enables the offset degree of the writing address to be determined by extracting the block number data of blocks, so that the concatenated recording can be also adequately performed.

Further, in the case of the third embodiment described, the data indicative of the presence or absence of a picture change-over point in each track is used in setting the recording start timing. Use of this data permits synchronized operations of two DDRs.

As described above, the data recorder according to this invention is of the kind having the picture change-over point of video data in recording tracks vary with the track and is arranged to record one picture amount of video data in more than 1 track. Despite of this, the embodiment is capable of detecting the presence or absence of the picture change-over point in each track. This permits various editing actions such as concatenated recording, synchronized operations, etc.

Figure 16:
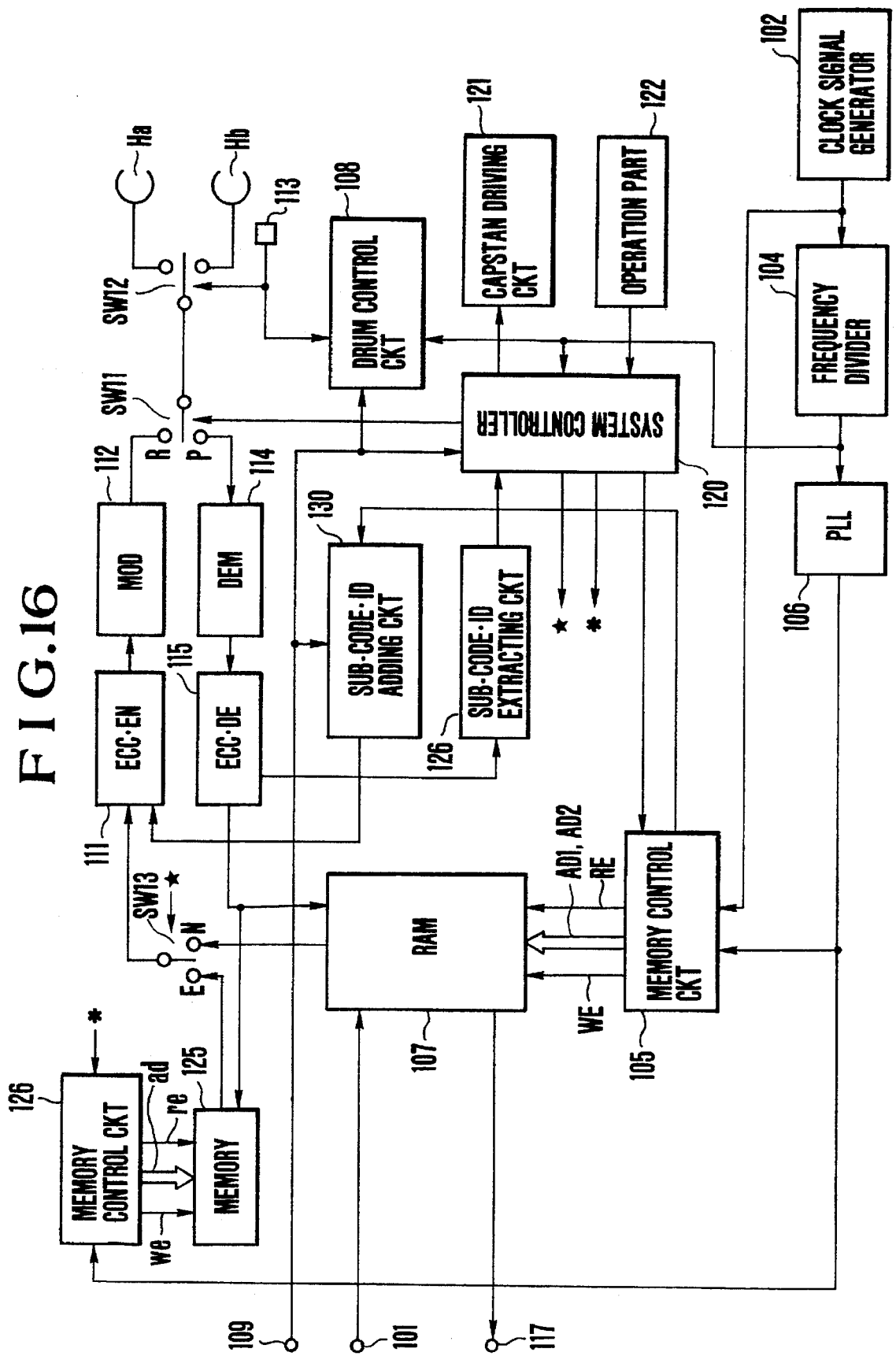
FIG. 16 shows in outline the arrangement of a digital data recorder arranged as a fourth embodiment of the invention.

FIG. 16 shows in outline the arrangement of a DDR which is arranged as a fourth embodiment of the invention. In FIG. 16, the same parts as those of FIG. 11 are indicated by the same reference numerals and the details of them are omitted from description.

The ID data and the sub-code data of the fourth embodiment are arranged as follows: For detection of the position of a block consisting of two sub-blocks, the ID data includes a block number indicating a vertical line position of this block in the format as shown in FIG. 15. The ID data also includes V data which indicates whether the block is the first block from the vertical sync signal position in the input image data. The block number and the V data are formed by a sub-code•ID adding circuit 130 on the basis of the control information of a memory control circuit 105 and an input image signal coming from a terminal 109. The sub-code data includes data which indicates the presence or absence of a vertical sync signal relative to one track amount of data including the sub-code data; vertical sync signal identifying data including data which shows whether the vertical sync signal follows the image signal of an odd-number field or follows the image signal of an even-number field; and track number data which indicates the serial number of the recording track. These sub-code data are also formed by the sub-code ID adding circuit 130 on the basis of the control information of the memory control circuit 105 and the input image signal coming from the terminal 109.

Figure 17:
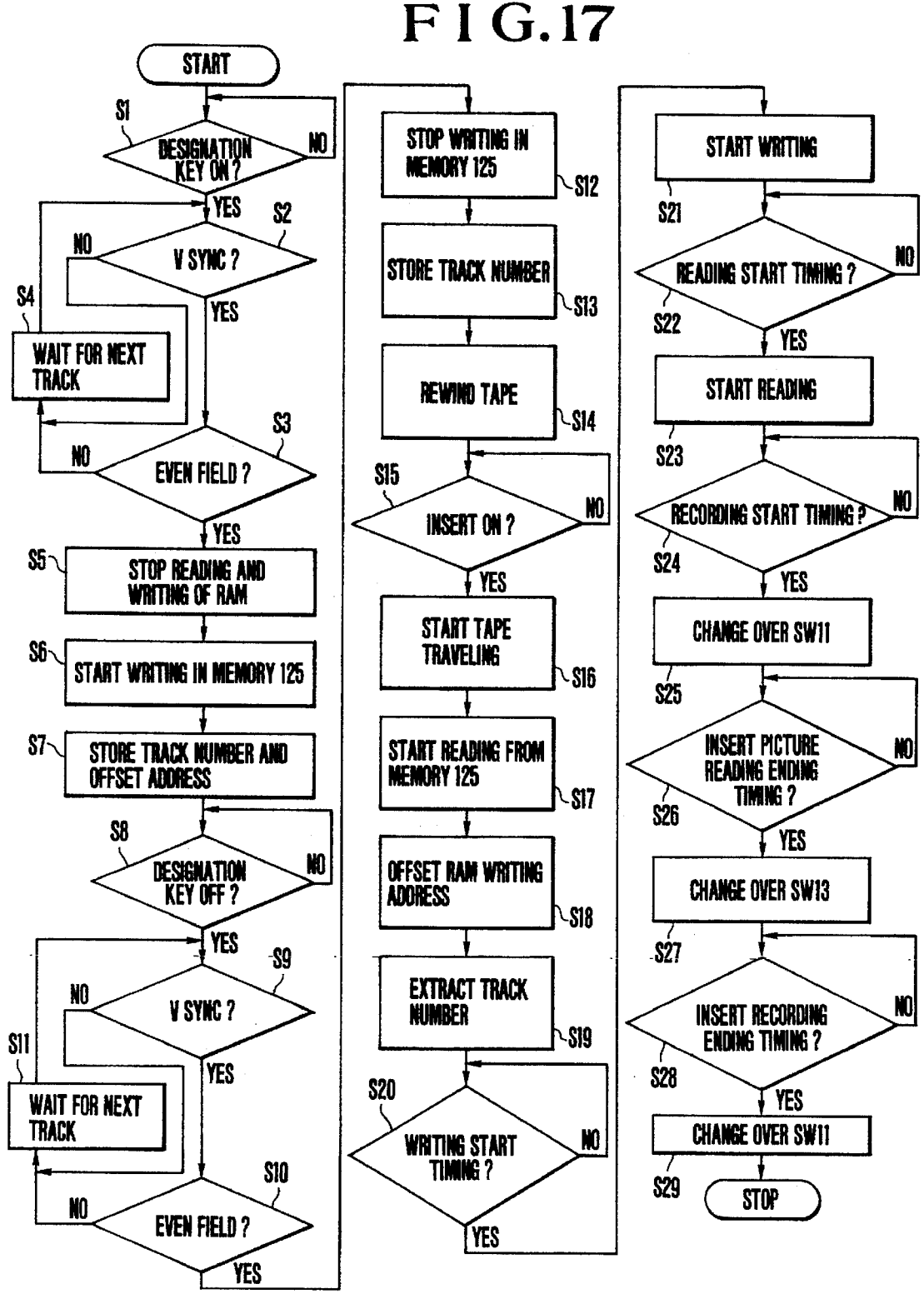
FIG. 17 is a flow chart showing the operation of the digital data recorder of FIG. 16.

Next, the insert recording operation of the DDR of the fourth embodiment is described below with reference to the flow chart of FIG. 17:

Step S1: When the system controller 120 shown in FIG. 17 detects that an insert recording position designation key disposed in an operation part 122 is turned on, the flow of operation proceeds to a step S2. Step S2: The above-stated vertical sync signal identifying data which is extracted by a sub-code•ID extracting circuit 126 is checked for the presence or absence of a vertical sync signal in the currently reproduced track. If the vertical sync signal is present, the flow proceeds to a step S3. Step S3: The vertical sync signal identifying data is again checked to find whether the vertical sync signal follows an even-number field. If the track is found to include no vertical sync signal at the step S2 or if the vertical sync signal is found to be following an odd-number field and not an even-number field at the step S3, the flow comes to a step S4. Step S4: The reproducing operation is allowed to continue. The flow waits for the reproduction of the video data of a next track.

After the reproducing operation is allowed to continue until it reaches a track having a vertical sync signal which follows an even-number field, the flow comes to a step S5. Step S5: The reproduced data is stopped from being written into the RAM 107 or from being read out and supplied to an output terminal 117. Step S6: Then, the system controller 120 causes a memory control circuit 126 to begin to write data in a memory 125 which has a data storing capacity for one track amount of data. More specifically, the memory control circuit 126 gives a writing enable signal "we" and a writing and reading address "ad" to the memory 125. In response to this, the memory 125 repeatedly writes reproduced data obtained from an ECC-DE 115. In this instance, the writing and reading addresses of the memory 125 are reset for every track. Further, this memory 125 may be composed of a FIFO memory (first-in-first-out memory) instead of a RAM. Assuming that the vertical sync signal which follows an even-number field and is detected at the steps S2 and S3 is a signal (A) included in the track T22 as shown in FIG. 13 and that the reproduced data obtained from the track T22 is written in the area a1 of the RAM 107, the area a1 of FIG. 14 has the data of the field (1) and the data of the field (2) written therein in the same manner as in the case of the third embodiment. Meanwhile, reproduced data from the tracks T17 to T21 are stored in other areas a2 to a5.

Step S7: Under this condition, the vertical sync signal identifying data of the track T22, the track number, the offset address data obtained according to the above-stated V data and the block number are stored in the system controller 120.

Step S8: When the insert recording position designation key is turned off, the flow proceeds to steps S9 to S11. Steps S9 to S11: The reproducing operation is allowed to continue until it reaches a track having a vertical sync signal which follows an even-number field. Step S12: Writing into the memory 125 is brought to a stop. In other words, reproduced data from this track is written into the memory 125 beginning at its initial address and is thereafter stored there in the above-stated state. Step S13: Then, the track number assigned to this track is stored in the system controller 120.

Step S14: After that, the system controller 120 causes a capstan driving circuit 121 to have the tape rewound to a point preceding an insert recording starting track by an given extent. Step S15: When an insert recording start switch is turned on, the flow comes to a step S16. Step S16: Again the tape is caused to begin to travel. Step S17: Meanwhile, a reading enable signal "re" is applied to the memory 125 to cause a reading action to begin according to the writing and reading address "ad". At this point of time, the position of the vertical sync signal has been found through the vertical sync signal identifying data of the track T22, the track number, the above-stated V data and the block number data. Therefore, it is known that the vertical sync signal part exists at an address which is offset to an extent "a" as shown in FIG. 14. Step S18: The system controller 120 causes the memory control circuit 105 to set the first writing address at this offset address position. Step S19: The tape is allowed to travel while the track number included in the sub-code of the data reproduced from each track is extracted by the sub-code•ID extracting circuit 126.

Step S20: The system controller 120 waits for arrival of a time point preceding, by one frame period, the timing of reading from the RAM 107 the data recorded in the track T22 on the basis of the above-stated track number and a signal of 100/3 Hz which is produced from a frequency divider 104. When a vertical sync signal following an even-number field comes from the terminal 109 for the first time after arrival of this point of time, the system controller 120 determines the input timing of this vertical sync signal to be writing start timing. Step S21: The memory control circuit 105 is controlled and caused to have a new video signal written into the RAM 107 beginning at the above-stated offset address. Step S22: Then, reading start timing arrives within one frame period after the start of writing. Upon detection of the reading timing, the flow proceeds to a step S23. Step S23: Data reading begins at the leading address of the area a1 of the RAM 107. Further, recording begins when the data thus read out reaches a switch SW11. In other words, the recording start timing comes when the head begins to trace the track T22. Step S24: Upon arrival of the recording start timing, the flow proceeds to a step S25.

Step S25: The connecting position of the switch SW11 is shifted from one side P thereof to the other side R. The actual recording begins. This flow of operation precludes the possibility of having any image discontinuity at the insert recording starting part.

A number of tracks for the insert recording from the start of the insert recording until the end thereof can be found by referring to the track number stored at the step S13 and the track number stored at the step S7. When the data of the last track of insert recording is being read out from the RAM 107, the data of this track includes without fail a vertical sync signal following an even-number field. Step S26: When this vertical sync signal part is read out, the inserting image reading process comes to an end. Step S27: The connecting position of a switch SW13 is shifted to one side E thereof. The reproduced data from the insert recording end track is serially read out from the memory 125 beginning at the initial address thereof. At the above-stated ending timing of reading the insert image, the vertical sync signal part is also read out from the memory 125. After this timing, the switch SW13 produces the data read out from the memory 125.

Step S28: The ending timing of insert recording comes upon completion of the recording action of the heads Ha and Hb on the end track. The connecting position of the switch SW11 is shifted to the side P to terminate the insert recording operation. If the tape is traveling at a given speed at that time, the video data of the last (end) track of the insert recording becomes continuous to video data recorded in the ensuing track.

In the case of the DDR of the fourth embodiment, the data of the track including a picture change-over point is temporarily stored in the memories such as the RAM 107 and the memory 125. Then, a data part located either before or after the picture change-over part of the stored data is used to form one track amount of data in conjunction with newly supplied data. The one-track amount of data thus formed is then recorded in one track. Therefore, video data can be newly recorded retaining its continuity to the record of existing video data.

In accordance with the arrangement of the fourth embodiment, as apparent from the foregoing description, the video data recording/reproducing apparatus of the recording format wherein the picture change-over point of video data obtained in one track is not the same in another can be made capable of newly recording video data on a recording medium having some existing record of video data without causing any disturbance in a reproduced picture at the concatenated part between the old and new records. The recording/reproducing apparatus thus permits editing work or the like to be adequately carried out without lowering the degree of recording density.

Figure 18:
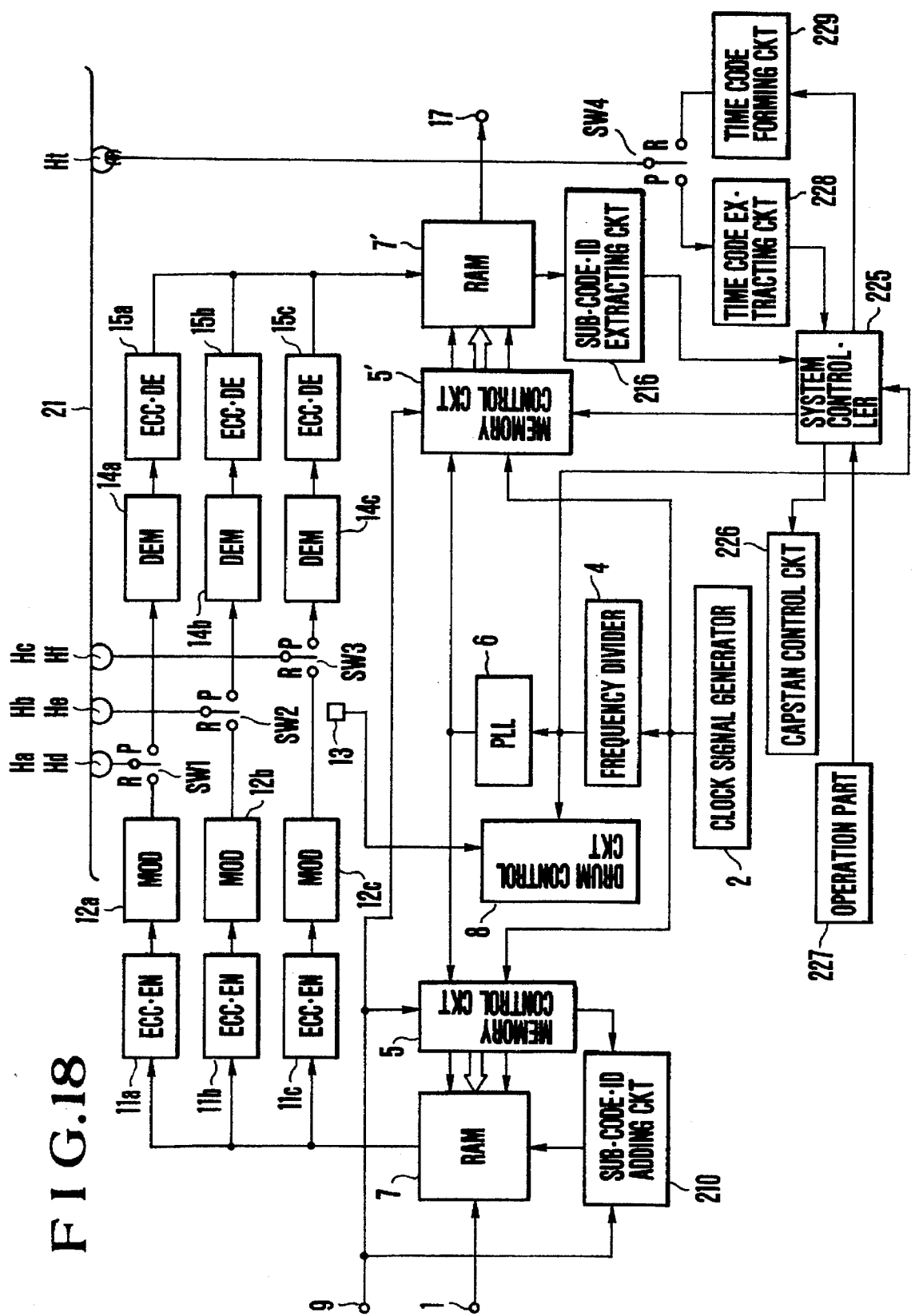
FIG. 18 shows in outline the arrangement of a digital data recorder arranged as a fifth embodiment of the invention.

FIG. 18 shows in outline the arrangement of a DDR which is arranged as a fifth embodiment of this invention. In FIG. 18, component parts similar to those shown in FIG. 3 are indicated by the same reference numerals. This DDR (the fifth embodiment) differs from the DDR of FIG. 3 (the first embodiment) in that a sub-code data SUB is included in the recording data format of one track as shown in FIG. 15 and that a time code can be recorded or reproduced by means of a fixed head Ht. The details of the ID data, the sub-code data and the time code are as described below:

Referring to the format shown in FIG. 15, the ID data includes a block number which indicates the vertical line position (within the format) of a block consisting of two sub-blocks for identification of the block position and, in addition to the block number, V data which indicates whether or not this block is the first of blocks following the vertical sync signal position in the input video data. The block number and the V data are formed by a sub-code•ID adding circuit 210 on the basis of the control data of a memory control circuit 5 and a vertical sync signal included in an input video signal coming through a terminal 9.

Further, in FIG. 15, a reference symbol SUB denotes the sub-code data. The sub-code data SUB includes the serial number (hereinafter referred to simply as field number) of a field corresponding to the one track amount of data in which the sub-code data is included. In case where two fields are included in one track, the sub-code data SUB includes two field numbers. The sub-code data is formed also by the sub-code•ID adding circuit 210 on the basis of the control data of the memory control circuit 5 and the input video signal coming from the terminal 9.

Referring to FIG. 18, a time code forming circuit 229 is arranged to form during the process of video data recording a time code in accordance with time information provided from a system controller 225. The time code thus formed is supplied via a terminal R of a switch SW4 to a fixed head Ht to be longitudinally recorded on the tape. The system controller 225 forms the time information on the basis of a clock signal produced from a frequency divider 4.

During a reproducing operation, the time code is reproduced by the head Ht. The reproduced time code is supplied via a terminal P of the switch SW4 to a time code extracting circuit 228. The circuit 228 then converts the reproduced time code back into the original time information and supplies it to the system controller 225.

Figure 19:
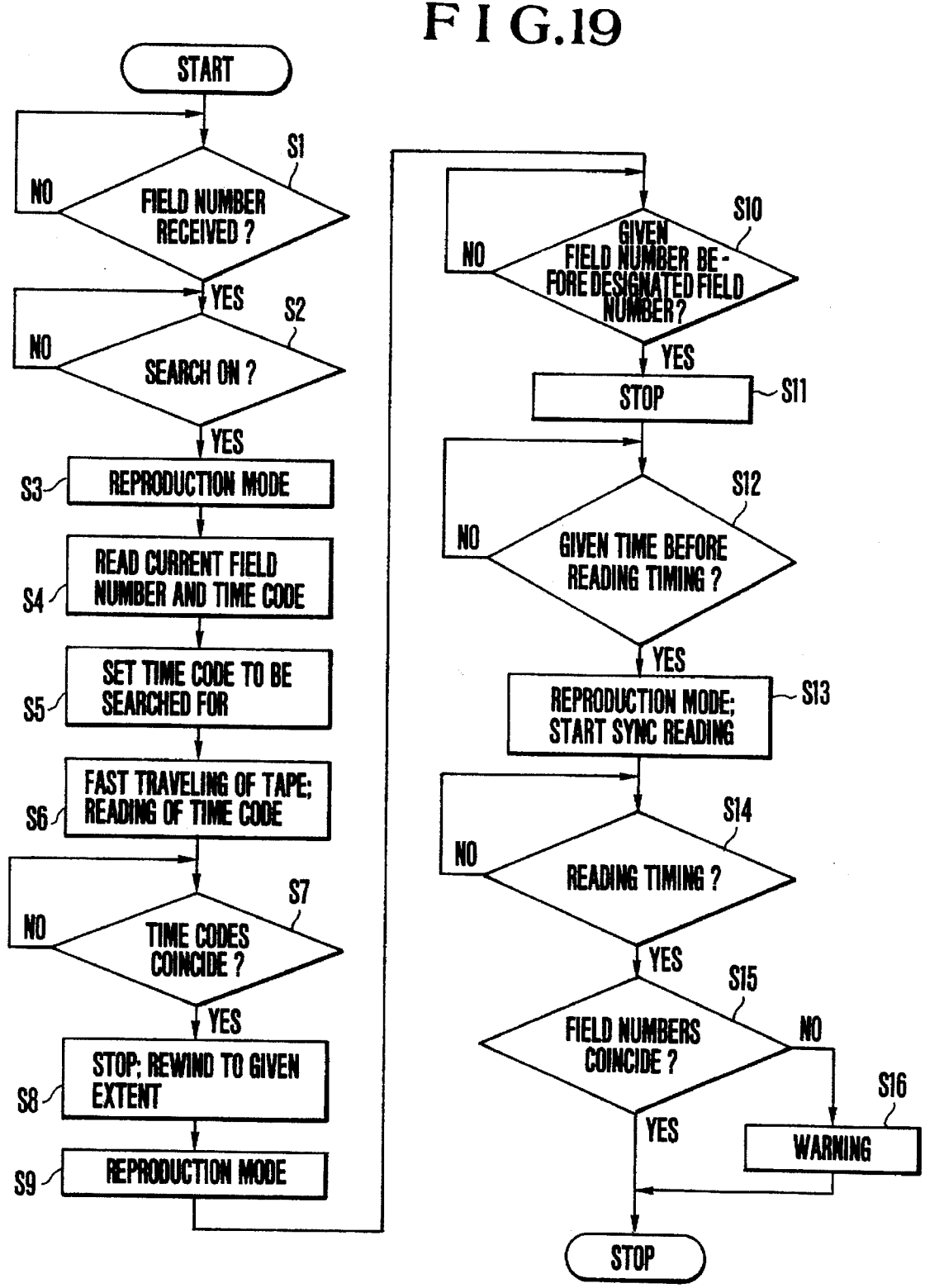
FIG. 19 is a flow chart showing the operation of the digital data recorder of FIG. 18.

With the DDR (the fifth embodiment) arranged as described above, data for a desired picture can be read out at desired timing by making a search for that specific data. FIG. 19 shows this operation in a flow chart as described below:

Step S1: A check is made for receipt of the field number of the picture to be searched for from an operation part 227. Step S2: When a search switch is turned on, the flow of operation comes to a step S3. Step S3: The system controller 225 brings the DDR into a reproduction mode by causing a capstan control circuit 226 to convey the tape at a normal speed. The field number supplied at that time is designated according to the field number which is included in the above-stated sub-code.

Step S4: In the reproduction mode obtained, the field number of the currently reproduced track is extracted by a sub-code•ID extracting circuit 216. Then, the field number and the time code which is extracted by a time code extracting circuit 228 are together stored in a memory disposed within the system controller 225. Step S5: The system controller 225 adds a difference between the field number received at the step S1 and the field number extracted at the step S4 to the time code extracted at the step S4 to obtain and set a searching time code to be searched for. Step S6: The capstan control circuit 226 causes the tape to travel at a high speed. The head Ht then performs a time code reading action. Step S7: A check is made to see if the time code extracted by the time code extracting circuit 228 has come to coincide with the above-stated searching time code. If so, the flow comes to a step S8. Step S8: The tape is temporarily stopped from traveling and is rewound to a given extent. Step S9: Again the DDR is brought into the reproduction mode. Step S10: When the field number which is included in the sub-code extracted by the sub-code•ID extracting circuit 216 becomes a number preceding the designated field number by a given number, the flow proceeds to a step S11. Step S11: The tape is brought to a stop.

If the field frequency is 60 Hz, for example, the tape is temporarily stopped from traveling when a field number preceding the designated field number is reproduced. Step S12: When time comes one second before the timing for reading the desired picture, the flow comes to a step S13. Step S13: Again the DDR is set in the reproduction mode. Reading from a RAM 7' is synchronized with a vertical sync signal coming to the terminal 9.

At that time, the position of a vertical sync signal which is then stored in the RAM 7' can be found from the block number and the V data extracted by the sub-code•ID extracting circuit 216. In other words, the sub-code•ID extracting circuit 216 which is shown in FIG. 18 extracts a block number. The writing address of the memory is controlled by the block number extracted. Further, the V data which is extracted at the same time enables a memory control circuit 5' to extract an offset degree X in the same manner as in the case of the first embodiment shown in FIG. 3. In this instance, if an external vertical sync signal is supplied via the terminal 9, reading is performed from the address of the above-stated offset degree X in synchronism with the external vertical sync signal. This enables the DDR to produce from a terminal 17 a reproduced signal data which is synchronized with the external vertical sync signal.

The video data thus can be read out from the RAM 7' in synchronism with the external vertical sync signal. Therefore, the external vertical sync signal is synchronized with a desired timing for reading. At a step S14, a check is made for the reading timing. The video data then can be adequately read out by field amounts in search of the picture of the desired field. Step S15: The field number included in the data of the one-track-amount data format read out at this reading timing should coincide with the designated field number. However, if not, due to something like a slip of the tape, the flow comes to a step S16. Step S16: A warning is given by a display or a sound.

The DDR described above as the fifth embodiment of the invention is capable of quickly reproducing the video data from a desired field at a desired timing despite of the fact that the field change-over position obtained in one track is not the same in another. Therefore, use of the invented DDR as a broadcasting VTR, for example, would be highly advantageous in forming a TV signal going on the air.

The embodiment described is arranged to perform reproduction from a desired field at a desired timing. However, this arrangement may be changed to perform reproduction only for the desired field. Further, the offset address of the RAM 7' cannot be stably set if the reproduction timing is inaccurate.

As described in the foregoing the video data reproducing apparatus arranged according to this invention permits a quick search operation for a desired picture even in cases where the picture change-over positions of the video data in the recording tracks on the tape are not uniform.

What is claimed is:

1. An apparatus for reproducing video signals from a recording medium on which video signals are recorded in many tracks, the recorded signals including video signals composed of plural blocks, positions of some boundary portions between the blocks of the video signals on corresponding tracks being different from each other, each of the blocks of the video signals corresponding to one frame portion of images, comprising:

(a) head means for reproducing the video signals from said tracks;

(b) memory means for storing the video signals reproduced by the said head means;

(c) detection means for detecting positions of boundary portions between the blocks by using the recorded signals reproduced by said head means to generate boundary information;

(d) output means for outputting the video signals read out from said memory means; and (e) memory control means for relatively controlling the writing and reading address of said memory means in accordance with the boundary information to adjust an output timing of the video signals from said output means.

2. An apparatus according to claim 1, wherein said head means includes a rotary head; and a vertical synchronizing period of the video signals is different from any periods which are an integer times a rotation period of said rotary head.

3. An apparatus according to claim 1, wherein said detection means generates the boundary information in accordance with other signals than the video signals reproduced by said head means.

4. An apparatus according to claim 3, wherein said detection means includes extracting means for extracting said other signals from the signals reproduced by said head means.

5. An apparatus according to claim 3, wherein the signals recorded in the tracks includes a plurality of data blocks each of which consists of video data and sub-data; said sub-data includes first data indicating whether the data block to which the sub-data belongs corresponds to the boundary portions, and said detection means generates the boundary information on the basis of said first data reproduced by said head means.

6. An apparatus according to claim 5, wherein said sub-data includes second data indicating a serial number position within each track of the data block to which said sub-data belongs, and said detection means generates the boundary information on the basis of said first and second data reproduced by said head means.

7. An apparatus according to claim 3, wherein each of the boundary portions in a corresponding track is obtained in one of an n number (n: an integer at least 2) of different positions, the other signals includes indication data indicating one of said number of different positions in which one of the boundary portions is obtained within the track wherein the other signals are recorded, and said detection means generates the boundary information on the basis of the indication data reproduced by said head means.

8. An apparatus for recording video signals on a recording medium on which video signals are recorded in many tracks, the recorded signals including video signals composed of plural blocks, positions of some boundary portions between the blocks of the video signals on corresponding tracks being different from each other, each of the blocks of the video signals corresponding to one frame portion of images, comprising:

(a) input means for inputting the video signals to be recorded;

(b) memory means for inputting the video signals input by said input means;

(c) recording means for recording the video signals read from said memory means on the recording medium;

(d) reproducing means for reproducing the recorded signals recorded on the recording medium;

(e) detection means for detecting positions of the boundary portions between the blocks by using the recorded signals reproduced by said reproducing means to generate boundary information; and (f) memory control means for relatively controlling the writing and reading address of said memory means in accordance with the boundary information to adjust a recording timing of the video signals of said recording means.

9. An apparatus according to claim 8, wherein said recording means includes a rotary head; and a vertical synchronizing period of the video signals is different from any periods which are an integer times a rotation period of said rotary head.

10. An apparatus according to claim 9, wherein said detection means generates the boundary information in accordance with other signals than the video signals reproduced by said reproducing means.

11. An apparatus according to claim 10, wherein said detection means includes extracting means for extracting said other signals from the signals reproduced by said reproducing means.

12. An apparatus according to claim 10, wherein the signals recorded in the tracks includes a plurality of data blocks each of which consists of video data and sub-data, said sub-data includes first data indicating whether the data block to which the sub-data belongs corresponds to the boundary portions, and said detection means generates the boundary information on the basis of said first data reproduced by said reproducing means.

13. An apparatus according to claim 10, wherein each of the boundary portions is obtained in one of an n number (n: an integer at least 2) of different positions in each track, the other signals includes indication data indicating one of said n number of different positions in which one of the boundary portions is obtained within the track wherein the other signals are recorded, and said detection means generates the boundary information on the basis of the indication data reproduced by said reproducing means.

14. An apparatus for recording video codes composed of plural blocks by forming many tracks on a recording medium, each of the plural blocks of the video codes corresponding to one frame portion of images, comprising:

(a) sub-codes generating means for generating sub-codes which include a code indicating whether a boundary portion between blocks of the video codes is present in each of the tracks to be formed on the recording medium;

(b) recording code processing means for dividing each of the plural blocks of the video codes into a plurality of segments and forming recording codes consisting of a plurality of sync blocks by adding a sync code and the sub-codes to each of the plurality of segments; and (c) recording means for recording the recording codes by forming many tracks on the recording medium so that said many tracks include a track having said boundary portion and a track having no boundary portion.

15. An apparatus according to claim 14, wherein the recording code processing means includes error-correction coding means for generating error-correction codes for correcting errors in the plural blocks of the video codes, and wherein the error-correction codes are added to each of the plurality of sync blocks.

16. An apparatus according to claim 14, further comprising reproduction means for reproducing the recording code from the recording medium, memory means for storing the video codes among the recording codes reproduced by said reproduction means, detection means for extracting the sub-codes from the recording codes reproduced by said reproduction means and detecting a boundary position between the frames on the basis of the extracted sub-codes and memory control means for controlling writing/reading operations of said memory means according to detection results of said detection means.

17. An apparatus for recording video codes composed of plural blocks by forming many tracks on a recording medium, each of the plural blocks of the video codes corresponding to one frame portion of images, comprising:

(a) sub-codes generating means for generating sub-codes which include a code indicative of positions on which a boundary portion between blocks of the video codes is arranged in each of the tracks to be formed on the recording medium;

(b) recording code processing means for dividing each of the plural blocks of the video codes into a plurality of segments and forming recording codes consisting of a plurality of sync blocks by adding a sync code and the sub-codes to each of the plurality of segments; and (c) recording means for recording the recording codes by forming many tracks on the recording medium so that said many tracks include a track having said boundary portion and a track having no boundary portion.

18. An apparatus according to claim 17, wherein the recording code processing means includes error-correction coding means for generating error-correction codes for correcting errors in the plural blocks of the video codes, and wherein the error-correction codes are added to each of the plurality of sync blocks.

19. An apparatus according to claim 17, further comprising reproduction means for reproducing the recording code from the recording medium, memory means for storing the video codes among the recording codes reproduced by said reproduction means, detection means for extracting the sub-codes from the recording codes reproduced by said reproduction means and detecting a boundary position between the frames on the basis of the extracted sub-codes and memory control means for controlling writing/reading operations of said memory means according to detection results of said detection means.

20. An apparatus for reproducing video signals from a recording medium on which video signals are recorded in many tracks, the recorded signals including video signals composed of plural blocks, positions of same boundary portions between the blocks of the video signals on corresponding tracks being different from each other, each of the blocks of the video signals corresponding to one frame portion of images, the recorded signals also including sub-signals which are used for discriminating the boundary portions between the blocks, comprising:

(a) reproducing means for reproducing the video signals and the sub-signals from the recording medium;

(b) memory means for storing the video signals reproduced by said reproducing means;

(c) detection means for detecting positions of the boundary portions between the blocks by using the sub-signals; and (d) memory control means for relatively controlling writing and reading operations of said memory means according to an output of said detection means to adjust reading timing of the video signals from said memory means.

21. An apparatus according to claim 20, wherein said memory control means controls read-out addresses of said memory means by using said sub-signals.

22. An apparatus according to claim 20, wherein each of said plural blocks of video signals is composed of a plurality of sync blocks each composed of a sync code and a predetermined amount of the video signal, an error-correction code for correcting an error in the video signals, and the sub-signals.

23. An apparatus according to claim 20, wherein the number of the tracks to be recorded with one block of the video signals varies between the blocks.

24. An apparatus according to claim 20, wherein said recording medium includes a magnetic tape and said reproducing means includes a rotary head which traces said magnetic tape.

25. An apparatus for recording video codes composed of plural blocks by forming many tracks on a recording medium, each of the plural blocks of the video codes corresponding to one frame of images, comprising:

(a) video codes processing means for dividing each of the plural blocks of the video codes into a plurality of segments;

(b) sub-codes generating means for generating sub-codes which include a code indicating whether a boundary portion between blocks of the video codes is present in each of the segments;

(c) recording code processing means for generating a plurality of sync blocks by adding a sync code and the sub-codes to each of the plurality of segments to form recording codes consisting of the plurality of sync blocks; and (d) recording means for recording the recording codes by forming many tracks on the recording medium so that said many tracks include a track having a boundary portion and a track having no boundary portion.

26. An apparatus according to claim 25, wherein said recording code processing means includes error-correction coding means for generating error correction codes for correcting errors in the plural blocks of the video codes, and wherein the error-correction codes are added to each of the plurality of sync blocks.

27. An apparatus according to claim 25, further comprising reproduction means for reproducing the recording code from the recording medium, memory means for storing the video codes among the recording codes reproduced by said reproduction means, detection means for extracting the sub-codes from the recording codes reproduced by said reproduction means and detecting a boundary position between the frames on the basis of the extracted sub-codes, and memory control means for controlling writing/reading operations of said memory means according to detection results of said detection means.

* * * * *